United States Patent
Jiang et al.

(10) Patent No.: US 11,787,990 B2
(45) Date of Patent: Oct. 17, 2023

(54) BIONIC AND DUAL-PHOBIC HIGH-PERFORMANCE WATER-BASED DRILLING FLUID

(71) Applicants: China University of Petroleum (Beijing), Beijing (CN); CNPC Chuanqing Drilling Engineering Company Limited, Chengdu (CN); CNPC ENGINEERING TECHNOLOGY R&D COMPANY LIMITED, Beijing (CN)

(72) Inventors: Guancheng Jiang, Beijing (CN); Jinsheng Sun, Beijing (CN); Yinbo He, Beijing (CN); Xin Zhang, Beijing (CN); Chunyao Peng, Beijing (CN); Tengfei Dong, Beijing (CN); Bin Tan, Beijing (CN); Tie Geng, Beijing (CN); Lili Yang, Beijing (CN); Xiaohu Luo, Beijing (CN); Xuwu Luo, Karamay (CN); Xing Liang, Beijing (CN); Changwei Chen, Beijing (CN); Xiaobo Liu, Beijing (CN); Rongchao Cheng, Beijing (CN); Jiansheng Luo, Beijing (CN); Jianguo Zhang, Beijing (CN); Yong Wang, Beijing (CN); Daqi Fu, Beijing (CN); Qifa Ran, Chengdu (CN); Li Zhao, Karamay (CN); Kaixiao Cui, Beijing (CN); Xiaoxiao Ni, Beijing (CN)

(73) Assignees: China University of Petroleum (Beijing), Beijing (CN); CNPC Chuanqing Drilling Engineering Company Limited, Sichuan (CN); CNPC Engineering Technology R&D Company Limited, Beijing (CN)

( * ) Notice: Subject to any disclaimer, the term of this patent is extended or adjusted under 35 U.S.C. 154(b) by 0 days.

(21) Appl. No.: 18/148,939

(22) Filed: Dec. 30, 2022

(65) Prior Publication Data
US 2023/0133053 A1 May 4, 2023

Related U.S. Application Data

(63) Continuation of application No. PCT/CN2021/114849, filed on Aug. 26, 2021.

(30) Foreign Application Priority Data

Aug. 26, 2020 (CN) .......................... 202010874082.8

(51) Int. Cl.
C09K 8/16 (2006.01)
C09K 8/24 (2006.01)
C09K 8/20 (2006.01)

(52) U.S. Cl.
CPC .................. *C09K 8/24* (2013.01); *C09K 8/16* (2013.01); *C09K 8/206* (2013.01); *C09K 2208/10* (2013.01); *C09K 2208/12* (2013.01); *C09K 2208/34* (2013.01)

(58) Field of Classification Search
CPC ...... C09K 8/16; C09K 8/206; C09K 2208/10; C09K 2208/12; C09K 2208/34
See application file for complete search history.

(56) References Cited

U.S. PATENT DOCUMENTS

| 4,299,710 | A | 11/1981 | Dupre et al. | |
|---|---|---|---|---|
| 2004/0005987 | A1 | 1/2004 | Ristol et al. | |
| 2009/0306276 | A1* | 12/2009 | Magnet | D21H 19/00 524/556 |
| 2011/0092396 | A1* | 4/2011 | Cliffe | C09K 8/24 507/120 |
| 2013/0230695 | A1 | 9/2013 | Sigmund et al. | |
| 2013/0341028 | A1* | 12/2013 | Christian | C09K 8/92 166/305.1 |
| 2014/0090850 | A1* | 4/2014 | Benicewicz | C09K 8/70 507/224 |
| 2015/0240143 | A1 | 8/2015 | Jiang et al. | |

(Continued)

FOREIGN PATENT DOCUMENTS

| CN | 104193927 A | 12/2014 |
|---|---|---|
| CN | 104946216 A | 9/2015 |

(Continued)

OTHER PUBLICATIONS

English translation of International Search Report from PCT/CN2021/114849 dated Nov. 23, 2021.

*Primary Examiner* — Alicia Bland
(74) *Attorney, Agent, or Firm* — CALFEE HALTER & GRISWOLD LLP

(57) ABSTRACT

The present invention relates to the field of petroleum industry phase oilfield chemistry, and specifically relates to a bionic and dual-phobic drilling fluid. The drilling fluid contains a bionic wall-fixing agent, a bionic lubricant, a super dual-phobic agent, a scrap-carrying agent and a bionic shale inhibitor. The present invention uses the theory of bionics and the theory of a downhole rock surface being double phobic as a basis. By means of using the bionic wall-fixing agent, the bionic lubricant, the super dual-phobic agent, the scrap-carrying agent and the bionic shale inhibitor, which have special properties of imitating animals and plants in nature, and using a series of bionic treatment agents, a set of bionic and dual-phobic drilling fluid systems, which corresponds to an unconventional, complex oil and gas well, is formed.

19 Claims, No Drawings

(56) References Cited

U.S. PATENT DOCUMENTS

| | | | |
|---|---|---|---|
| 2017/0218259 A1* | 8/2017 | Fujii | C09K 8/685 |
| 2017/0362486 A1* | 12/2017 | Santos | E21B 21/00 |
| 2018/0112118 A1* | 4/2018 | Wu | C09K 8/88 |
| 2018/0127636 A1* | 5/2018 | Reddy | C09K 8/44 |
| 2018/0320056 A1* | 11/2018 | Mazyar | C09K 8/58 |

FOREIGN PATENT DOCUMENTS

| | | |
|---|---|---|
| CN | 105802593 A | 7/2016 |
| CN | 105907380 A | 8/2016 |
| CN | 106010478 A | 10/2016 |
| CN | 106010482 A | 10/2016 |
| CN | 106634878 A | 5/2017 |
| CN | 109337657 A | 2/2019 |
| CN | 113651932 A | 11/2021 |
| CN | 113667462 A | 11/2021 |
| CN | 113698510 A | 11/2021 |
| CN | 113698534 A | 11/2021 |
| CN | 113698796 A | 11/2021 |
| CN | 113773815 A | 12/2021 |
| GB | 2420572 A | 5/2006 |

\* cited by examiner

BIONIC AND DUAL-PHOBIC HIGH-PERFORMANCE WATER-BASED DRILLING FLUID

CROSS REFERENCE TO RELATED APPLICATIONS

This application is a bypass continuation of PCT/CN2021/114849, filed Aug. 26, 2021, which claims the benefit of Chinese patent application 202010874082.8 filed on 26 Aug. 2020, the contents of which are incorporated herein by reference.

TECHNICAL FIELD

The present invention relates to petroleum industry phase oilfield chemistry, and specifically relates to a bionic and dual-phobic high-performance water-based drilling fluid.

BACKGROUND

The United States has rapidly changed from the world's largest oil and gas importing country to the exporting country by realizing the "shale revolution" in just a decade, and has changed the global energy landscape. The shale revolution is essentially a technical revolution, and safe, efficient and low-cost drilling fluid technology is a key technology contributing to the United States shale revolution.

The contradiction between supply and demand of oil and gas resources in China has seriously endangered the national energy safety. In 2019, the external dependence of petroleum reaches 72%, which is far beyond the internationally recognized safety warning line of 50%; and natural gas dependence on the exterior has rapidly increased to over 43%. Meanwhile, more than 87.4% of petroleum import in China needs to pass through "throat" requirements such as Humutz straits, Malaysia straits and the like. The unpredictable international situation makes oil gas import passages in China face severe risks, and oil gas supply safety threat is huge, and increasing domestic oil gas yield is an important way to break the predicament.

The quantity of unconventional and complex oil and gas resources in China is huge, and the oil and gas resources are the second in the world, occupying more than 75% of the residual oil and gas resources in China, so that the unconventional and complex oil and gas resources are important relay resources for guaranteeing the safety of energy strategy in China, and they become the main battlefield for exploration and development in China gradually, and become research hotspots and exploration and development key points internationally.

Drilling is the only engineering technology means for communicating underground oil and gas with the ground. Drilling fluid is an engineering fluid technology for ensuring the safe, efficient and smooth implementation of drilling engineering, and is also called the "blood" of drilling engineering. However, unconventional and complex oil and gas resources newly discovered in China and even in the world are mainly distributed in mountainous areas, deserts, plateaus, loess tablelands, Arctic Circles and ocean coverage areas. The geological and ground conditions encountered in drilling are becoming more and more complex, and the exploration and development are becoming more and more difficult. Frequent occurrence of complex conditions and accidents such as borehole wall collapse, blockage and stuck drilling, well leakage, unclean well bore, damage to oil and gas layers, environmental pollution and the like, and the oil and gas yield is low, and the cost is high, and the efficiency is low. The drilling fluid technology is facing unprecedented challenges, which severely restricts the success or failure of the drilling and the exploration and development process of unconventional and complex oil and gas wells, and it has become a "stuck neck" technical problem for efficient exploration and development of the unconventional and complex oil and gas.

Meanwhile, compared with the United states, unconventional and complex hydrocarbon reservoirs in China are buried deeper, the formation pressure and temperature are higher, faults and cracks are more, the rock types and properties are more complex, which make more complex and special characteristics of borehole wall collapse, blockage and sticking, well leakage, unclean borehole, hydrocarbon reservoir damage and environmental pollution. The water-based drilling fluid has inherent defects in the aspects of borehole wall stability, lubricity and oil-gas layer protection, so that the problems cannot be solved by the original water-based drilling fluid technology in China. The technical problems cannot be solved by the advanced technology in the United States, namely the advanced technology is strictly blocked in China, and is not suitable for the situation of a complex stratum and cannot be solved. Although the oil-based drilling fluid has excellent well wall stability, lubricity and hydrocarbon reservoir protection, and is usually the first choice for drilling high-difficulty wells, the oil-based drilling fluid has limited application due to the defects of serious environmental pollution, high preparation cost, high well leakage treatment difficulty, difficult scrap-carrying, poor well cementation quality for a long time and the like. Therefore, in the new normative state of increasingly complex formation drilling conditions, strict environmental protection requirements and large fluctuation of oil prices, since the 21st century, domestic and foreign hot research on high-performance water-based drilling fluids with the advantages of water-based drilling fluids and oil-based drilling fluids has been made some progress in the past 10 years, but only the performance of a certain aspect have been improved to a certain extent compared with the prior art, and no substantial breakthrough is made. For example, the wellbore stability, lubricity and hydrocarbon reservoir protection effect have not reached or exceeded the level of oil-based drilling fluid. Borehole wall collapse, blockage and sticking, well leakage, unclean well bore, hydrocarbon reservoir damage and environmental pollution are not only the key and common important technical problems in the field of drilling fluid, but also are the technical problems of unconventional and complex oil gas in high-efficiency exploration and development and the "stuck neck" for realizing the "shale revolution" in China.

Because the technical problem of the drilling fluid in drilling cannot be solved by the existing drilling fluid theory and technology, it is necessary to base on independent innovation, and combine with the advanced theory and method newly developed by other subjects, and pursue innovation in theory, method and technology. A new material of the drilling fluid series is invented at first, then an original water-based drilling fluid system is invented, and a brand-new drilling fluid theory and technology are created, which solve the key, common and stuck neck technical problems of 'borehole wall collapse, blockage and sticking drilling, well leakage, unclean well hole, damage of oil and gas layer and environmental pollution' which are not solved for a long time in the unconventional and complex oil and gas drilling process at home and abroad at present, and provide a core technology for realizing the shale revolution of the Chinese model, meeting the requirements of safe, efficient, economic and environment-friendly drilling and the coordinated development of the petroleum industry and environmental protection.

DISCLOSURE OF INVENTION

The invention aims to introduce bionics into the field of drilling fluid, and combines the theory of the dual-phobic type of the surface of an underground rock, and provides a drilling fluid system which meets the requirements of safe, efficient, economic and environment-friendly drilling and the coordinated development of the petroleum industry and environmental protection. In order to achieve the aim, on one hand, the invention provides a bionic and dual-phobic drilling fluid (in particular a bionic and dual-phobic high-performance water-based drilling fluid), and the drilling fluid contains a bionic wall-fixing agent, a bionic lubricant, a super dual-phobic agent, a scrap-carrying agent and a bionic shale inhibitor;

the bionic wall-fixing agent is an acrylamide polymer containing a structural unit shown in a formula (1-a), a structural unit shown in a formula (2-a), a structural unit shown in a formula (3-a) and a structural unit shown in a formula (4-a), wherein the molar ratio of the structural unit shown in the formula (1-a), the structural unit shown in the formula (2-a), the structural unit shown in the formula (3-a) and the structural unit shown in the formula (4-a) is 1:(1.05-3):(0.5-0.95):(0.2-0.9);

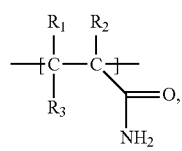

formula (1-a)

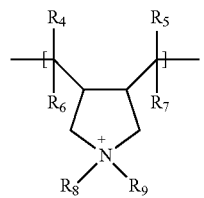

formula (2-a)

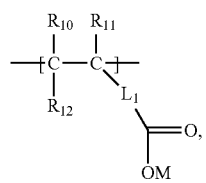

formula (3-a)

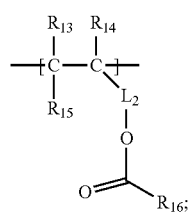

formula (4-a)

wherein $R_1$-$R_7$, $R_{10}$-$R_{12}$ and $R_{13}$-$R_{15}$ are each independently selected from H and C1-C6 alkyl; $R_8$-$R_9$ and $R_{16}$ are selected from alkyl groups of C1-C8; M is selected from H or alkali metal elements; $L_1$ and $L_2$ are each independently selected from the group consisting of C0-C6 alkylene;

the bionic lubricant is a block polymer, and the block polymer comprises a block A containing a carboxylic ester structural unit and a benzene-containing structural unit, and a block B containing an acrylamide structural unit connected with the block A; the benzene-containing structural unit is a structural unit shown in a formula (1-b); the carboxylic ester structural unit is one or more of structural units shown in formulas (2-b) and (3-b); the acrylamide structural unit is a structural unit shown in a formula (4-b);

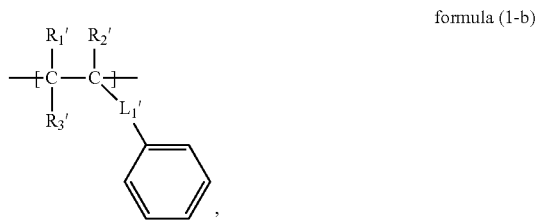

formula (1-b)

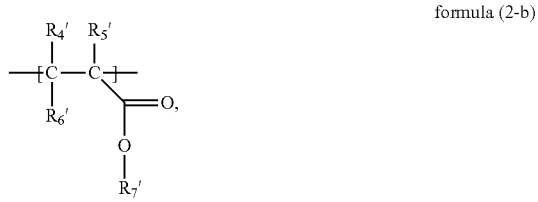

formula (2-b)

formula (3-b)

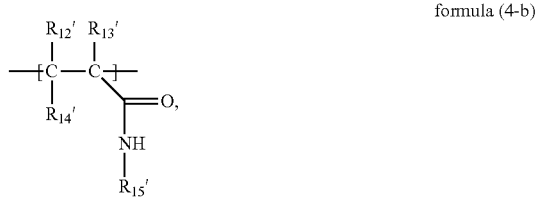

formula (4-b)

wherein $R_1'$-$R_2'$, $R_4'$-$R_6'$, $R_8'$-$R_{10}'$ and $R_{12}'$-$R_{14}'$ are each independently selected from H and C1-C6 alkyl; $L_1'$ is selected from C0-C6 alkylene; $R_7'$ and $R_{11}'$ are selected from C1-C8 alkyl; $R_{15}'$ is selected from H, C1-C8 alkyl, -$L_2'$-SOOM'; $L_2'$ is selected from alkylene of C1-C6, and M' is H or alkali metal element; $R_3'$ is selected from H, C1-C6 alkyl, phenyl or phenyl-substituted alkyl of C1-C6;

the super dual-phobic agent is a modified carbon nanotube with a modifying group on the surface, wherein the modifying group comprises a modifying group provided by a silane coupling agent containing unsaturated carbon-carbon double bonds, perfluorosulfonyl halide represented by a formula $R^1SO_2X$ and siloxane represented by a formula $R^3Si(OR^2)_3$; wherein $R^1$ is perfluoro-substituted alkyl of C4-C12, X represents halogen; $R^3$ is selected from alkyl of C1-C6 and alkoxy of C1-C6, $R^2$ is selected from alkyl of C1-C6;

the scrap-carrying agent is an $Al_2O_3/SiO_2$ composite material, and the composite material comprises solid particles containing $Al_2O_3$ and $SiO_2$, and a polyacrylamide polymer modified on the surface of the solid particles; wherein the polyacrylamide polymer contains structural units shown in a formula (1-c) and a formula (2-c):

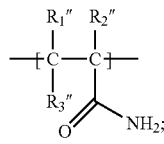

formula (1-c)

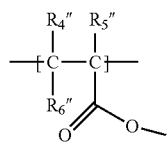

formula (2-c)

wherein, $R_1''$-$R_6''$ are each independently selected from H or C1-C6 alkyl; $L''$ is selected from C0-C6 alkylene; $R_7''$ is selected from C6-C20 alkyl substituted by halogen;

the bionic shale inhibitor is modified chitosan, and the modified chitosan is connected with a modifying group with a structure shown in a formula (1-d); formula (1-d): —CH$_2$—CH(OH)CH$_2$-polyamine structure; and the polyamine structure is provided by polyamine compounds.

In a second aspect the invention provides the use of a drilling fluid as described above in oil and gas drilling.

Based on a bionics theory and a downhole rock surface dual-phobic theory, a bionic wall-fixing agent, a bionic lubricant, a super dual-phobic agent, a scrap-carrying agent and a bionic shale inhibitor with special performances of nature-imitating animals and plants are used as a core to form a bionic and dual-phobic drilling fluid system applied to an unconventional and complex oil and gas well. From an international frontier external cause method for only improving the self-inhibition and lubricity of the drilling fluid, it is developed to an internal and external cause combination method for simultaneously improving the quality of wellbore wall while drilling, so that the well wall rock strength is damaged and converted into wall-fixing while drilling, and the suction force of a rock capillary tube to water is reversed into resistance, and the well wall high friction resistance is converted into ultra-low friction resistance, and the well wall stability, lubricity and reservoir protection effect of the water-based drilling fluid exceed those of a typical oil-based drilling fluid. Meanwhile, the waste drilling fluid is acceptable in environment, and becomes a part of nutrient and ecological circulation systems of plants in the nature, so that it is upgraded into the ecological drilling fluid from environmental protection, realizing the integrated aims of high well-forming rate, good reservoir protection effect, low cost and environmental friendliness, and solving the major technical problem that the advantages of the oil-based drilling fluid are not integrated into the water-based drilling fluid for more than 10 years at home and abroad. The average well collapse rate is reduced by 82.6%, and the well leakage occurrence rate is reduced by 80.6%, and the friction drag complex rate is reduced by more than 80%, and the speed is increased by more than 30%, and the yield of the oil-gas well is improved by more than 1.5 times than before. It converts the well which can be completely drilled by using the oil-based drilling fluid into the water-based drilling fluid to be completely drilled, and becomes an effective core technology for developing unconventional oil-gas resources in scale, benefit and environmental protection. The technology opens up a new research direction for reservoir protection technology and promotes the coordinated development of the petroleum industry and environmental protection.

DETAILED DESCRIPTION

The endpoints of the ranges and any values of the ranges disclosed herein are not limited to the precise range or value, and these ranges or values shall be understood to encompass values adjacent to these ranges or values. For numerical ranges, each range between its endpoints and individual point values, and each individual point value can be combined with each other to give one or more new numerical ranges, and such numerical ranges should be construed as specifically disclosed herein.

In a first aspect, the present invention provides a bionic and dual-phobic drilling fluid which contains a bionic wall-fixing agent, a bionic lubricant, a super dual-phobic agent, a scrap-carrying agent and a bionic shale inhibitor;

the bionic wall-fixing agent is an acrylamide polymer containing a structural unit shown in a formula (1-a), a structural unit shown in a formula (2-a), a structural unit shown in a formula (3-a) and a structural unit shown in a formula (4-a), wherein the molar ratio of the structural unit shown in the formula (1-a), the structural unit shown in the formula (2-a), the structural unit shown in the formula (3-a) and the structural unit shown in the formula (4-a) is 1:(1.05-3):(0.5-0.95):(0.2-0.9);

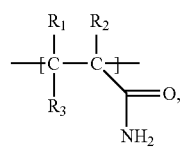

formula (1-a)

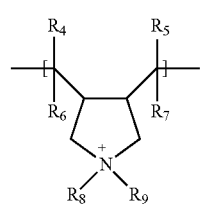

formula (2-a)

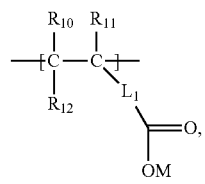

formula (3-a)

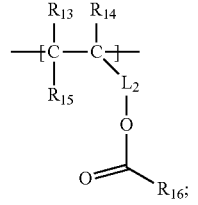

formula (4-a)

wherein $R_1$-$R_7$, $R_{10}$-$R_{12}$ and $R_{13}$-$R_{15}$ are each independently selected from H and C1-C6 alkyl; $R_8$-$R_9$ and $R_{16}$ are selected from alkyl groups of C1-C8; M is selected from H or alkali metal elements; $L_1$ and $L_2$ are each independently selected from the group consisting of C0-C6 alkylene;

the bionic lubricant is a block polymer, and the block polymer comprises a block A containing a carboxylic ester structural unit and a benzene-containing structural unit, and a block B containing an acrylamide structural unit connected with the block A; the benzene-containing structural unit is a structural unit shown in a formula (1-b); the carboxylic ester structural unit is one or more of structural units shown in formulas (2-b) and (3-b); the acrylamide structural unit is a structural unit shown in a formula (4-b);

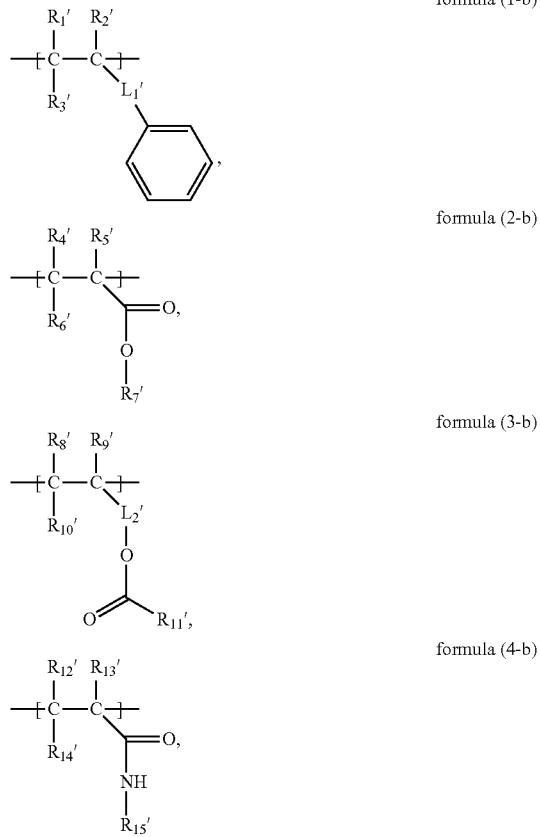

formula (1-b)

formula (2-b)

formula (3-b)

formula (4-b)

wherein $R_1'$-$R_2'$, $R_4'$-$R_6'$, $R_8'$-$R_{10}'$ and $R_{12}'$-$R_{14}'$ are each independently selected from H and C1-C6 alkyl; $L_1'$ is selected from C0-C6 alkylene; $R_7'$ and $R_{11}'$ are selected from C1-C8 alkyl; $R_{15}'$ is selected from H, C1-C8 alkyl, -$L_2'$-SOOM', $L_2'$ is selected from alkylene of C1-C6, and M' is H or alkali metal element; $R_3'$ is selected from H, C1-C6 alkyl, phenyl or phenyl-substituted alkyl of C1-C6;

the super dual-phobic agent is a modified carbon nanotube with a modifying group on the surface, wherein the modifying group comprises a modifying group provided by a silane coupling agent containing unsaturated carbon-carbon double bonds, perfluorosulfonyl halide represented by a formula $R^1SO_2X$ and siloxane represented by a formula $R^3Si(OR^2)_3$; wherein $R^1$ is perfluoro-substituted alkyl of C4-C12, X represents halogen; $R^3$ is selected from alkyl of C1-C6 and alkoxy of C1-C6, $R^2$ is selected from alkyl of C1-C6;

the scrap-carrying agent is an $Al_2O_3/SiO_2$ composite material, and the composite material comprises solid particles containing $Al_2O_3$ and $SiO_2$, and the polyacrylamide polymer modified on the surface of the solid particles;

wherein the polyacrylamide polymer contains structural units shown in a formula (1-c) and a formula (2-c):

formula (1-c)

formula (2-c)

wherein, $R_1''$-$R_6''$ are each independently selected from H or C1-C6 alkyl; L'' is selected from C0-C6 alkylene; $R_7''$ is selected from C6-C20 alkyl substituted by halogen;

the bionic shale inhibitor is modified chitosan, and the modified chitosan is connected with a modifying group with a structure shown in a formula (1-d); formula (1-d): —$CH_2$—CH(OH)$CH_2$-polyamine structure; and the polyamine structure is provided by polyamine compounds.

According to the present invention, the polymer for the bionic wall-fixing agent can inhibit the hydration expansion of shale to stabilize the well wall and is a nontoxic and degradable well wall stabilizer, the well wall stabilizer can effectively improve the strength of rock and inhibit the hydration expansion of the shale to achieve the effect of stabilizing the well wall. Meanwhile, a water-based drilling fluid system mainly composed of the well wall stabilizer has good rheological fluid loss performance and is nontoxic and degradable.

Preferably, in the bionic wall-fixing agent, the molar ratio of the structural unit shown in the formula (1-a), the structural unit shown in the formula (2-a), the structural unit shown in the formula (3-a), the structural unit shown in the formula (4-a) is 1:(1.1-2):(0.6-0.95):(0.5-0.9), preferably 1:(1.2-1.5):(0.8-0.9):(0.7-0.85).

Preferably, the weight average molecular weight of the polymer as the bionic wall-fixing agent is 80000-250000 g/mol, preferably 95000-220000 g/mol, more preferably 100000-200000 g/mol (for example 105000-198000 g/mol), and further preferably 130000-160000 g/mol.

$R_1$-$R_7$, $R_{10}$-$R_{12}$ and $R_{13}$-$R_{15}$ are each independently selected from H and C1-C4 alkyl; $R_8$-$R_9$ and $R_{16}$ are selected from alkyl groups of C1-C6; M is selected from H, Na or K; $L_1$ and $L_2$ are each independently selected from the group consisting of C0-C4 alkylene.

Preferably, $R_1$-$R_7$, $R_{10}$-$R_{12}$ and $R_{13}$-$R_{15}$ are each independently selected from H, methyl, ethyl or n-propyl; $R_8$-$R_9$ and $R_{16}$ are selected from methyl, ethyl, n-propyl, isopropyl, n-butyl or isobutyl; M is selected from H, Na or K; $L_1$ and $L_2$ are each independently absent, —$CH_2$—, —$CH_2CH_2$—, —$CH_2CH_2CH_2$— or —$CH_2CH_2CH_2CH_2$—.

Preferably, the structural unit represented by formula (1-a) is provided by acrylamide and/or methacrylamide; the structural unit represented by the formula (2-a) is provided by one or more of dimethyldiallylammonium chloride, dimethyldiallylammonium fluoride, diethyldiallylammonium chloride, diethyldiallylammonium fluoride, dimethyldi (2-alkenylbutyl) ammonium chloride, dimethyldi (2-alkenylbutyl) ammonium fluoride, diethyldi (2-alkenylbutyl) ammonium chloride and diethyldi (2-alkenylbutyl) ammonium fluoride; the structural unit shown in the formula (3-a) is provided by one or more of acrylic acid, methacrylic acid, 2-butenoic acid, sodium acrylate, sodium methacrylate and sodium 2-butenoate; the structural unit represented by the formula (4-a) is provided by one or more of vinyl acetate, vinyl n-propionate, isopropenyl acetate, isopropenyl n-propionate, propenyl acetate and propenyl n-propionate.

Wherein, preferably, the preparation method of polymer suitable for well wall stabilizer comprises: carrying out a polymerization reaction of a monomer represented by formula (1'-a), a monomer represented by formula (2'-a), a monomer represented by formula (3'-a) and a monomer represented by formula (4'-a) in an aqueous solvent in the presence of an initiator, wherein the molar ratio of the monomers represented by formula (1'-a), formula (2'-a), formula (3'-a) and formula (4'-a) is 1:(1.05-3):(0.5-0.95):(0.2-0.9);

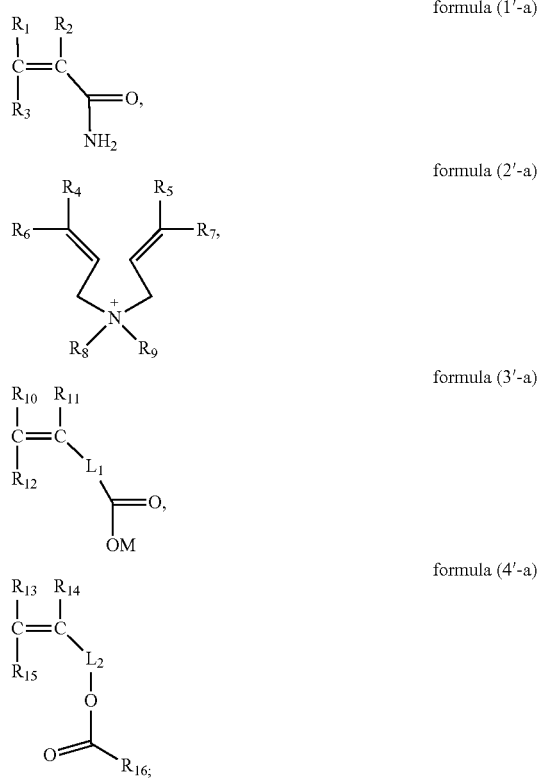

formula (1'-a)

formula (2'-a)

formula (3'-a)

formula (4'-a)

wherein $R_1$-$R_7$, $R_{10}$-$R_{12}$ and $R_{13}$-$R_{15}$ are each independently selected from H and C1-C6 alkyl; $R_8$-$R_9$ and $R_{16}$ are selected from alkyl groups of C1-C8; M is selected from H or alkali metal elements; $L_1$ and $L_2$ are each independently selected from the group consisting of C0-C6 alkylene.

The groups of the above monomers may be specifically selected in accordance with the structural units described above.

Preferably, the monomer represented by the formula (1'-a), the monomer represented by the formula (2'-a), the monomer represented by the formula (3'-a), and the monomer represented by the formula (4'-a) are used in a molar ratio of 1:(1.1-2):(0.6-0.95):(0.5-0.9), more preferably 1:(1.2-1.5):(0.8-0.9):(0.7-0.85).

Preferably, the method is such that the weight average molecular weight of the polymer is 80000-250000 g/mol, preferably 95000-220000 g/mol, more preferably 100000-200000 g/mol (e.g. 105000-198000 g/mol), even more preferably 130000-160000 g/mol.

Preferably, the conditions of the polymerization reaction include: the temperature is 60-80° C., and the time is 3-6 h. More preferably, the conditions of the polymerization reaction include: the temperature is 65-69° C., and the time is 3-5 h. In order to facilitate the initiation reaction, gas may be introduced into the reaction system to displace the air, and the introduced gas may be a substantially reaction-inert gas selected from nitrogen, helium, neon, and the like.

Preferably, the initiator is one or more of ammonium persulfate, potassium persulfate and sodium persulfate, and the amount thereof is preferably 0.05 to 2.5 wt %, preferably 0.1 to 1 wt %, and more preferably 0.4 to 0.7 wt % (based on the total weight of the monomer represented by the formula (1'-a), the monomer represented by the formula (2'-a), the monomer represented by the formula (3'-a) and the monomer represented by the formula (4'-a)).

According to the invention, the block polymer used as the lubricant can effectively improve the friction performance of the rock debris surface adsorption film and simultaneously improve the temperature resistance of the system, the lubricant can effectively improve the drilling speed and the well wall stability of a well with a complex structure, and the water-based drilling fluid system consisting of the lubricant has a great promotion effect on the acceleration and the efficiency improvement of the drilling of the well with the complex structure in future.

Preferably, in the bionic lubricant, the molar ratio of the benzene-containing structural unit, the carboxylic ester structural unit, the acrylamide structural unit is (2-10):1:(0.01-0.8), preferably (2-5):1:(0.1-0.5), more preferably (2.2-5):1:(0.12-0.3); more preferably (2.2-3.5):1:(0.12-0.2).

Preferably, the block A is a trackless copolymer block consisting of benzene-containing structural units and carboxylic ester structural units, or is a two-block polymer block consisting of a block A1 consisting of benzene-containing structural units and a block A2 consisting of carboxylic ester structural units.

Preferably, the weight average molecular weight of the block polymer is 10000-50000 g/mol, preferably 12000-40000 g/mol, more preferably 15000-30000 g/mol, such as 15000-25000 g/mol.

Preferably, $R_1'$-$R_2'$, $R_4'$-$R_6'$, $R_8'$-$R_{10}'$ and $R_{12}'$-$R_{12}'$-$R_{14}'$ are each independently selected from H and C1-C4 alkyl; $L_1'$ is selected from C0-C4 alkylene; $R_7'$ and $R_{11}'$ are each independently selected from the group consisting of C1-C6 alkyl; $R_{15}'$ is selected from H, C1-C6 alkyl or -$L_2'$-SOOM', $L_2'$ is selected from alkylene of C1-C6, and M' is H, Na or K; $R_3'$ is selected from H, C1-C4 alkyl, phenyl or phenyl-substituted alkyl of C1-C4.

Preferably, $R_1'$-$R_2'$, $R_4'$-$R_6'$, $R_8'$-$R_{10}'$ and $R_{12}'$-$R_{14}'$ are each independently selected from H, methyl, ethyl or n-propyl; $L_1'$ is absent, —$CH_2$—, —$CH_2CH_2$—, —$CH_2CH_2CH_2$— or —$CH_2CH_2CH_2CH_2$—; $R_7'$ and $R_{11}'$ are each independently selected from methyl, ethyl, n-propyl, isopropyl, n-butyl or isobutyl; $R_{15}'$ is selected from H, methyl, ethyl, n-propyl, isopropyl, n-butyl, isobutyl, —$CH_2$—SOOM', —$CH_2CH_2$—SOOM', —$CH_2CH_2CH_2$—SOOM', —$CH(CH_3)CH_2$—SOOM', —$CH_2CH(CH_3)$—SOOM', —$C(CH_3)_2$—SOOM', —$CH_2CH_2CH_2CH_2$—SOOM', —$CH(CH_3)CH_2CH_2$—SOOM', —$CH_2CH(CH_3)CH_2$—SOOM', —$CH_2CH_2CH(CH_3)$—SOOM', —$C(CH_3)_2CH_2$—SOOM' or —$CH_2C(CH_3)_2$—SOOM', M' is H, Na or K; $R_3'$ is selected from H, methyl, ethyl, n-propyl, phenyl or benzyl.

Preferably, the benzene-containing structural unit is provided by a compound selected from styrene and derivatives thereof, and stilbene and derivatives thereof; the carboxylic ester structural unit is provided by a compound selected from butyl acrylate and derivatives thereof, methyl methacrylate and derivatives thereof, and vinyl acetate and derivatives thereof; the acrylamide structural unit is provided by a compound selected from acrylamide and derivatives thereof, 2-acrylamidopropanesulfonic acid and derivatives thereof, and 2-acrylamido-2-methylpropanesulfonic acid and derivatives thereof. The benzene-containing structural units may also be provided by polystyrene, such as polystyrene with a molecular weight of 5000-10000 g/mol (preferably 5000-8000 g/mol).

Preferably, the method of preparing a block polymer for a bionic lubricant, the method comprising:

carrying out first emulsion polymerization on a benzene-containing monomer and a carboxylic ester monomer in the presence of a first initiator;

introducing an acrylamide-based monomer into a product of the first emulsion polymerization in the presence of a second initiator to perform the second emulsion polymerization;

wherein the benzene-containing monomer is a benzene-containing polymer composed of a structural unit shown in a formula (1-b) or a monomer shown in a formula (1'-b); the carboxylic ester monomer is one or more of monomers shown in formulas (2'-b) and (3'-b); the acrylamide monomer is a monomer shown in a formula (4'-b);

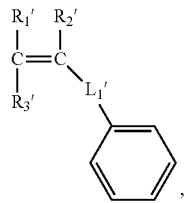
formula (1'-b)

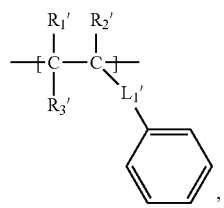
formula (1-b)

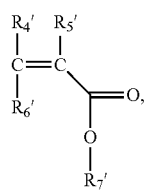
formula (2'-b)

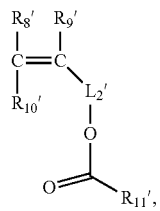
formula (3'-b)

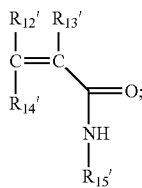
formula (4'-b)

wherein $R_1'$-$R_2'$, $R_4'$-$R_6'$, $R_8'$-$R_{10}'$ and $R_{12}'$-$R_{14}'$ are each independently selected from H and C1-C6 alkyl; $L_1'$ is selected from C0-C6 alkylene; $R_7'$ and $R_{11}'$ are selected from C1-C8 alkyl; $R_{15}'$ is selected from H, C1-C8 alkyl or -$L_2'$-SOOM', $L_2'$ is selected from alkylene of C1-C6, and M' is H or alkali metal element; $R_3'$ is selected from H, C1-C6 alkyl, phenyl or phenyl-substituted C1-C6 alkyl.

Preferably, the molar ratio of the benzene-containing monomer to the carboxylic ester monomer to the acrylamide-based monomer is (2-10):1:(0.01-0.8), preferably (2-5):1:(0.1-0.5), more preferably (2.2-5):1:(0.12-0.3), more preferably (2.2-3.5):1:(0.12-0.2).

Preferably, the weight average molecular weight of the block polymer is 10000-50000 g/mol, preferably 12000-40000 g/mol, more preferably 15000-30000 g/mol, such as 15000-25000 g/mol.

The respective groups of the above monomers may be selected in accordance with the structural units described above.

Preferably, the benzene-containing monomer is provided of a compound selected from the group consisting of styrene and derivatives thereof, and stilbene and derivatives thereof; the carboxylic ester monomer is provided by a compound selected from butyl acrylate and derivatives thereof, methyl methacrylate and derivatives thereof, and vinyl acetate and derivatives thereof; the acrylamide monomer is a compound selected from acrylamide and derivatives thereof, 2-acrylamidopropanesulfonic acid and derivatives thereof, and 2-acrylamido-2-methylpropanesulfonic acid and derivatives thereof. Wherein, the benzene-containing monomer can also be provided by polystyrene, such as polystyrene with the molecular weight of 5000-10000 g/mol (preferably 5000-8000 g/mol).

Preferably, the first introducing agent and the second initiator are each independently selected from potassium persulfate or ammonium persulfate. Wherein, the amount of the first introducing agent may be 0.005 mol % to 0.5 mol % (preferably 0.01 mol % to 0.1 mol %, more preferably 0.01 mol % to 0.03 mol %) relative to the total molar amount of the benzene-containing monomer and the carboxylic ester-based monomer. The second introducing agent may be used in an amount of 0.001 mol % to 0.05 mol % (preferably 0.005 mol % to 0.02 mol %, for example, 0.005 mol % to 0.015 mol %) relative to the total molar amount of the benzene-containing monomer, the carboxylic acid ester monomer, and the acrylamide monomer.

The benzene-containing monomer may be washed with an aqueous alkaline solution before use, for example, an aqueous alkaline solution of 10 wt % to 20 wt % may be used, and the alkaline compound may be sodium hydroxide, potassium hydroxide, lithium hydroxide, or aqueous ammonia.

Before the first emulsion polymerization, the benzene-containing monomer and the carboxylic ester monomer may be mixed, sheared and emulsified, and then the first initiator is introduced to perform the first emulsion polymerization reaction. Wherein the shearing emulsification process comprises the step of shearing emulsification of a benzene-containing monomer and a carboxylic ester monomer in water, and the dosage of the benzene-containing monomer and the carboxylic ester monomer makes the total concentration of the benzene-containing monomer and the carboxylic ester monomer in the obtained emulsion be 0.1-0.5 mol/mL.

In order to facilitate the first emulsion polymerization, the emulsion may be purged with gas to displace the air in the emulsion, and the gas to be purged may be selected from nitrogen, helium, neon and other substantially reaction-inert gases.

Preferably, the conditions of the first emulsion polymerization comprise:
the temperature is 30-50° C., and the time is 30-90 min.

Preferably, the conditions of the second emulsion polymerization comprise: the temperature is 60-70° C., and the time is 1.5-6 h, preferably 2-4 h.

According to the invention, the super dual-phobic agent provided by the invention can have the surface characteristics of high electronegativity, easy structure and low surface energy, effectively reverse the surface wettability, and prevent the contact of a liquid phase and reservoir clay minerals, and greatly reduce the frictional resistance among solid phase particles and drilling tools in the drilling process due to the small-scale effect of the nano material, and plug the pores at the nano-micron level, thereby realizing the multi-purpose of one agent. A set of high-efficiency water-based drilling fluid system is formed by taking the super dual-phobic agent as a core, which can improve the drilling speed of a complex well, and further promote the exploration and development of unconventional oil and gas reservoirs.

Preferably, $R^1$ is perfluoro substituted alkyl of C6-C10, X represents fluorine or chlorine; $R^3$ is selected from C2-C6 alkyl and C2-C6 alkoxy, and $R^2$ is selected from C1-C4 alkyl. More preferably, $R^3$ is selected from C1-C4 alkyl and C1-C4 alkoxy, and $R^2$ is selected from C1-C4 alkyl.

Preferably, $R^1$ is perfluoro substituted C6 alkyl, perfluoro substituted C8 alkyl or perfluoro substituted C10 alkyl, X represents fluorine or chlorine; $R^3$ is selected from methyl, ethyl, n-propyl, n-butyl, methoxy, ethoxy, n-propoxy, or n-butoxy; $R^2$ is selected from methyl, ethyl, n-propyl, isopropyl or n-butyl.

Preferably, the silane coupling agent containing unsaturated carbon-carbon double bond is one or more of acryloxy C1-C8 alkyltrialkoxysilane, methacryloxy C1-C8 alkyltrialkoxysilane, acrylamido C1-C8 alkyltrialkoxysilane, methacrylamido C1-C8 alkyltrialkoxysilane, vinyltrialkoxysilane and propenyl trialkoxysilane; the perfluorosulfonyl halide represented by the formula $R^1SO_2X$ is one or more of perfluorohexylsulfonyl fluoride, perfluorohexylsulfonyl chloride, perfluorooctylsulfonyl fluoride, perfluorooctylsulfonyl chloride, perfluorodecylsulfonyl fluoride and perfluorodecylsulfonyl chloride; the siloxane represented by the formula $R^3Si(OR^2)_3$ is one or more of methoxy triethoxysilane, methoxy tripropoxysilane, ethoxytripropoxysilane and ethoxytrimethoxysilane.

Among them, the acryloxy C1-C8 alkyltrialkoxysilane may be specifically selected from acryloxy methyltrimethoxysilane, acryloxymethyltriethoxysilane, acryloxymethyltri-n-propoxysilane, 2-acryloxyethyltrimethoxysilane, 2-acryloxyethyltriethoxysilane, 2-acryloxyethyltri-n-propoxysilane, γ-acryloxypropyltrimethoxysilane, γ-acryloxypropyltriethoxysilane, and γ-acryloxypropyltri-n-propoxysilane.

The methacryloxy C1-C8 alkyltrialkoxysilane can be specifically selected from methacryloxymethyltrimethoxysilane, methacryloxymethyltriethoxysilane, methacryloxymethyltri-n-propoxysilane, 2-methacryloxyethyltrimethoxysilane, 2-methacryloxyethyltriethoxysilane, 2-methacryloxyethyltri-n-propoxysilane, γ-methacryloxypropyltrimethoxysilane, γ-methacryloxypropyltriethoxysilane, γ-methacryloxypropyltri-n-propoxysilane.

The acrylamido C1-C8 alkyltrialkoxysilane may be specifically selected from acrylamidomethyltrimethoxysilane, acrylamidomethyltriethoxysilane, acrylamidomethyltri-n-propoxysilane, 2-acrylamidoethyltrimethoxysilane, 2-acrylamidoethyltriethoxysilane, 2-acrylamidoethyltri-n-propoxysilane, γ-acrylamidopropyltrimethoxysilane, γ-acrylamidopropyltriethoxysilane, γ-acrylamidopropyltri-n-propoxysilane.

The methacrylamido C1-C8 alkyltrialkoxysilane can be selected from methacrylaminomethyltrimethoxysilane, methacrylaminomethyltriethoxysilane, methacrylaminomethyltri-n-propoxysilane, 2-methacrylaminoethyltrimethoxysilane, 2-methacrylaminoethyltriethoxysilane, 2-methacrylaminoethyltri-n-propoxysilane, γ-methacrylamidopropyltrimethoxysilane, γ-methacrylamidopropyltriethoxysilane, γ-methacrylamidopropyltri-n-propoxysilane.

The vinyltrialkoxysilane can be selected from vinyltrimethoxysilane, vinyltriethoxysilane and vinyltri-n-propoxysilane.

The propenyl trialkoxysilane can be selected from propenyl trimethoxysilane, propenyl triethoxysilane and propenyl tri-n-propoxysilane.

In a preferred embodiment of the present invention, the silane coupling agent containing unsaturated carbon-carbon double bond is γ-methacryloxypropyltrimethoxysilane; the perfluorosulfonyl halide represented by the formula $R^1SO_2X$ is perfluorooctylsulfonyl fluoride, and the siloxane represented by the formula $R^3Si(OR^2)_3$ is methoxytriethoxysilane.

Preferably, the carbon nanotubes are single-walled carbon nanotubes or multi-walled carbon nanotubes; more preferably, the tube diameter of the single-walled carbon nanotube is 2-50 nm (preferably 5-30 nm, such as 2-12 nm, 10-25 nm), the length is 1000-20000 nm (preferably 5000-15000 nm, such as 10000-15000 nm); the inner diameter of the multi-walled carbon nanotube is 2-30 nm (preferably 5-30 nm, such as 2-12 nm and 10-25 nm), the outer diameter is 5-50 nm (preferably 10-30 nm, such as 10-25 nm and 12-15 nm), and the length is 1000-30000 nm (preferably 5000-25000 nm, such as 15000-20000 nm).

Preferably, in the modified carbon nanotube, the molar ratio of the modified carbon nanotube, the modifying group provided by the silane coupling agent containing unsaturated carbon-carbon double bond, the modifying group provided by the perfluorosulfonyl halide represented by the formula $R^1SO_2X$, and the modifying group provided by the siloxane represented by the formula $R^3Si(OR^2)_3$ is 1:0.05-0.5:0.2-5:0.5-6, preferably 1:0.1-0.3:0.5-2:1-3, more preferably 1:0.2-0.25:1-2:1.5-3.

Preferably, the preparation method of the super dual-phobic agent comprises the following steps:
carrying out carboxylation treatment on the carbon nano tube in an acid-containing solution;
carrying out the first contact reaction on the carbon nano tube subjected to carboxylation treatment and the silane coupling agent containing unsaturated carbon-carbon double bonds;

the perfluorosulfonyl halide represented by the formula R¹SO₂X and the siloxane represented by the formula R³Si(OR²)₃ are introduced into the product after the first contact reaction to perform the second contact reaction.

Preferably, the acid-containing solution is the mixed solution of strong acid (selected from concentrated sulfuric acid or concentrated nitric acid) and hydrogen peroxide. Among them, the concentrated sulfuric acid may have a sulfuric acid concentration of 70 wt % or more, particularly 90 wt % or more, and more preferably 98 wt % or more. The nitric acid concentration of the concentrated nitric acid may be 50 wt % or more, preferably 60 wt % or more, and particularly 65 wt % or more. The concentration of the hydrogen peroxide may be 3 to 30 wt %, or may be 5 to 20 wt %. In the acid-containing solution, the weight ratio of the strong acid to the hydrogen peroxide is 1:0.5-10, preferably 1:2-3.

According to the invention, the carboxylation treatment can form an appropriate amount of oxygen-containing groups on the surface of the carbon nano tube so as to allow subsequent contact reaction to form the required modified groups of the invention. The amount of acid-containing solution can vary within wide limits and is generally sufficient to adequately disperse the carbon nanotubes, for example, the amount of acid-containing solution is such that the carbon nanotubes are present in an amount of 0.5-10% by weight.

Preferably, the carboxylation treatment conditions include: the temperature is 50-100° C., and the time is 25-100 min.

Preferably, the conditions of the first contact reaction include: the temperature is 50-100° C., and the time is 25-100 min; the conditions of the second contact reaction include: the temperature is 50-100° C., and the time is 1.5-8 h.

More preferably, the conditions of the first contact reaction include: the temperature is 60-90° C., and the time is 30-90 min; the conditions of the second contact reaction include: the temperature is 60-90° C. (preferably 70-80° C.), and the time is 2-6 h (preferably 2-4 h).

According to the invention, the scrap-carrying agent can effectively improve the wettability of the surface of the rock debris, and converts the hydrophilic and oleophilic wettability of the surface of the rock debris into the hydrophobic and oleophobic air wettability, so that the relative density of the rock debris is reduced, and the scrap-carrying effect of a system is improved through the rheological property of a polymer; the Al₂O₃/SiO₂ composite material serving as an efficient scrap-carrying agent can effectively improve the wettability of the surface of rock debris, and converts the hydrophilic and oleophilic wettability of the surface of the rock debris into hydrophobic and oleophobic air wettability, so that the relative density of the rock debris is reduced, and the scrap-carrying effect of a system is improved through the rheological property of a polymer. A set of high-efficiency scrap-carrying water-based drilling fluid system is formed by taking the scrap-carrying agent as a core, so that the drilling speed of a complex well and the purification efficiency of a well bore are improved, and the exploration and development of unconventional oil and gas reservoirs are further promoted.

Preferably, in the scrap-carrying agent, $R_1''$-$R_6''$ are each independently selected from H or C1-C4 alkyl; L" is selected from C0-C4 alkylene; $R_7''$ is selected from C4-C16 alkyl substituted by halogen.

Preferably, $R_1''$-$R_6''$ are each independently selected from H, methyl, ethyl or n-propyl; L" is absent, —CH₂—, —CH₂CH₂—, —CH₂CH₂CH₂— or —CH₂CH₂CH₂CH₂—; $R_7''$ is selected from C6-C12 alkyl substituted by fluorine, chlorine or bromine.

Preferably, $R_7''$ is selected from perfluoro substituted C6 alkyl, undecafluoro substituted C6 alkyl, nonafluoro substituted C6 alkyl, perfluoro substituted C8 alkyl, pentadecafluoro substituted C8 alkyl, tridecfluoro substituted C8 alkyl, undecafluoro substituted C8 alkyl, nonafluoro substituted C8 alkyl, perfluoro substituted C10 alkyl, nonadecafluoro substituted C10 alkyl, heptadecafluoro substituted C10 alkyl, pentadecafluoro substituted C10 alkyl, tridecafluoro substituted C10 alkyl, undecafluoro substituted C10 alkyl, nonafluoro substituted C10 alkyl, perfluoro substituted C12 alkyl, tricosafluoro substituted C12 alkyl, heneicosafluoro substituted C12 alkyl, nonadecafluoro substituted C12 alkyl, heptadecafluoro substituted C12 alkyl, pentadecafluoro substituted C12 alkyl, tridecafluoro substituted C12 alkyl, undecafluoro substituted C12 alkyl or nonafluoro substituted C12 alkyl.

Preferably, the structural unit represented by the formula (1-c) is provided by acrylamide and/or methacrylamide; the structural unit shown in the formula (2-c) is provided by one or more of nonafluorohexyl acrylate, nonafluorohexyl methacrylate, perfluorohexyl acrylate, perfluorohexyl methacrylate, tridecafluorooctyl acrylate, tridecafluorooctyl methacrylate, perfluorooctyl acrylate, perfluorooctyl methacrylate, heptadecafluorodecyl acrylate, heptadecafluorodecyl methacrylate, perfluorodecyl acrylate and perfluorodecyl methacrylate.

Preferably, in the polyacrylamide polymer, the molar ratio of the structural units shown in the formula (1-c) to the structural units shown in the formula (2-c) is 1:0.2-5, preferably 1:0.4-1, and more preferably 1:0.5-0.8; or in the composite material, the molar ratio of the solid particles calculated by Al₂O₃ to the structural units shown in the formulae (1-c) and (2-c) in the polyacrylamide polymer is 1:(1-15):(0.5-10), preferably 1:(2-10):(1-5), more preferably 1:(2-8):(1-3).

Preferably, the molecular weight of the polyacrylamide polymer is 20000-120000 g/mol, preferably 30000-97000 g/mol, and more preferably 40000-90000 g/mol.

Preferably, the molar ratio of Al₂O₃ to SiO₂ in the solid particles is 1:1-5, preferably 1:2-4; or the solid particles are silicate containing Al₂O₃, preferably kaolin, more preferably nano kaolin, and the particle size of the solid particles may be, for example, 50-2000 nm, preferably 100-1000 nm, for example 100-500 nm.

Preferably, the solid particles and the polyacrylamide polymer are bonded through a silane coupling agent. Preferably, the silane coupling agent is a silane coupling agent containing unsaturated carbon-carbon double bonds, and more preferably, the silane coupling agent containing unsaturated carbon-carbon double bonds is one or more of acryloxy C1-C8 alkyltrialkoxysilane, methacryloxy C1-C8 alkyltrialkoxysilane, acrylamido C1-C8 alkyltrialkoxysilane, methacrylamido C1-C8 alkyltrialkoxysilane, vinyl trialkoxysilane and propenyl trialkoxysilane.

The acryloxy C1-C8 alkyltrialkoxysilane can be selected from acryloxymethyltrimethoxysilane, acryloxymethyltriethoxysilane, acryloxymethyltri-n-propoxysilane, 2-acryloxyethyltrimethoxysilane, 2-acryloxyethyltriethoxysilane, 2-acryloxyethyltri-n-propoxysilane, γ-acryloxypropyltrimethoxysilane, γ-acryloxypropyltriethoxysilane, γ-acryloxypropyltri-n-propoxysilane.

The methacryloxy C1-C8 alkyltrialkoxysilane can be specifically selected from methacryloxymethyltrimethoxysilane, methacryloxymethyltriethoxysilane, methacryloxymethyltri-n-propoxysilane, 2-methacryloxyethyltrimethoxysilane, 2-methacryloxyethyltriethoxysilane, 2-methacryloxyethyltri-n-propoxysilane, γ-methacryloxypropyltrimethoxysilane, γ-methacryloxypropyltriethoxysilane, γ-methacryloxypropyltri-n-propoxysilane.

The acrylamido C1-C8 alkyltrialkoxysilane may be specifically selected from acrylamidomethyltrimethoxysilane, acrylamidomethyltriethoxysilane, acrylamidomethyltri-n-propoxysilane, 2-acrylamidoethyltrimethoxysilane, 2-acrylamidoethyltriethoxysilane, 2-acrylamidoethyltri-n-propoxysilane, γ-acrylamidopropyltrimethoxysilane, γ-acrylamidopropyltriethoxysilane, γ-acrylamidopropyltri-n-propoxysilane.

The methacrylamido C1-C8 alkyltrialkoxysilane can be selected from methacrylaminomethyltrimethoxysilane, methacrylaminomethyltriethoxysilane, methacrylaminomethyltri-n-propoxysilane, 2-methacrylaminoethyltrimethoxysilane, 2-methacrylaminoethyltriethoxysilane, 2-methacrylaminoethyltri-n-propoxysilane, γ-methacrylamidopropyltrimethoxysilane, γ-methacrylamidopropyltriethoxysilane, γ-methacrylamidopropyltri-n-propoxysilane.

The vinyltrialkoxysilane can be selected from vinyltrimethoxysilane, vinyltriethoxysilane and vinyltri-n-propoxysilane.

The propenyl trialkoxysilane can be selected from propenyl trimethoxysilane, propenyl triethoxysilane and propenyl tri-n-propoxysilane.

In a preferred embodiment of the present invention, the silane coupling agent is preferably γ-methacryloxypropyltrimethoxysilane (KH-570).

Preferably, the preparation method of the $Al_2O_3/SiO_2$ composite material comprises the following steps:

carrying out surface modification on solid particles containing $Al_2O_3$ and $SiO_2$ by adopting a silane coupling agent;

carrying out polymerization reaction on the product subjected to surface modification in the step (1) and compounds shown in formulas (1'-c) and (2'-c);

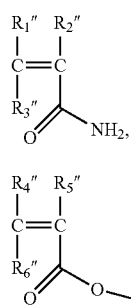

formula (1'-c)

formula (2'-c)

wherein, $R_1''$-$R_6''$ are each independently selected from H or C1-C6 alkyl; $L''$ is selected from C0-C6 alkylene; $R_7''$ is selected from C6-C20 alkyl substituted by halogen.

The above compounds were selected and proportioned as described above.

In a preferred embodiment of the present invention, the compound of formula (1'-c) is selected from acrylamide and/or methacrylamide; the compound shown in the formula (2'-c) is selected from one or more of nonafluorohexyl acrylate, nonafluorohexyl methacrylate, perfluorohexyl acrylate, perfluorohexyl methacrylate, tridecafluorooctyl acrylate, tridecafluorooctyl methacrylate, perfluorooctyl acrylate, perfluorooctyl methacrylate, heptadecafluorodecyl acrylate, heptadecafluorodecyl methacrylate, perfluorodecyl acrylate and perfluorodecyl methacrylate.

Preferably, in step (1), the conditions of the surface modification include:

the temperature is 40-80° C., and the time is 25-100 min. In the step (2), the conditions of the polymerization reaction include: the temperature is 40-80° C., and the time is 1.5-8 h.

More preferably, the conditions of the surface modification include: the temperature is 45-65° C., and the time is 30-90 min.

More preferably, the conditions of the polymerization reaction include: the temperature is 45-65° C., and the time is 2-6 h.

In the present invention, in step (1), the solid particles and the silane coupling agent may be dispersed and mixed in a solvent, wherein the solvent may be an alcohol solvent, particularly an alcohol-water mixed solvent (the volume ratio of alcohol/water may be 1:1-3, preferably 1:1-1.5), and the alcohol may be selected from methanol, ethanol, ethylene glycol, and the like. The amount of solvent may vary within wide limits. For example, the solid particles are present in the solvent in an amount of from 0.01 g/mL to 10 g/mL, preferably from 0.05 g/mL to 2 g/mL, more preferably from 0.05 g/mL to 0.2 g/mL.

In the present invention, in the step (2), the polymerization reaction may be carried out in the presence of an initiator, and the initiator may be selected from a variety of initiators capable of initiating the polymerization reaction of the monomer of the present invention. For example, the initiator may be one or more of potassium persulfate, ammonium persulfate, and the like. The amount of initiator can be adjusted according to the needs of the polymerization reaction. In the present invention, in order to modify the surface of the solid particles with more suitable polymer chains to obtain more excellent scrap-carrying effect, it is preferable that the initiator is used in an amount of 0.1% to 3% by weight, preferably 0.5% to 1.5% by weight, relative to the total weight of the compounds represented by the formulae (1'-c) and (2'-c).

According to the invention, the drilling fluid can also contain a plugging agent, and preferably adopts nano onion carbon as a bionic plugging agent. The bionic plugging agent provided by the invention has a high matching ratio of the nano-scale spherical structure to the pore size, and can obviously improve the plugging effect; and has excellent performance, and can meet the development requirement of modern drilling fluid. Nano onion Carbons (CNOs) are nano-scale spherical structures composed of multi-shell concentric graphite layers, and have excellent physical and chemical properties due to a special curved closed graphite layered structure and a large specific surface area, and show excellent small-size effects, quantum size effects and superior thermal stability. The nano-scale spherical structure and the excellent performance thereof can efficiently plug special crack pores in the shale, thereby improving the stability of the well wall; and has little effect on reservoir damage and environmental pollution. The onion carbon micro-nano structure is taken as a core to form a set of bionic plugging agent with the onion carbon micro-nano structure, so that exploration and development of unconventional oil and gas resources, namely shale gas and compact oil, can be effectively improved.

Preferably, in the bionic plugging agent, the diameter of the nano onion carbon is 10-100 nm, and preferably 30-40 nm.

Preferably, the innermost layer of the nano onion carbon consists of 50 to 80 carbon atoms, preferably 60 to 70 carbon atoms.

Preferably, the distance between the layers of the nano onion carbon is 0.1-0.5 nm, and preferably 0.25-0.35 nm.

Preferably, the nano onion carbon has 10 to 100 carbon layers, preferably 50 to 80 carbon layers.

In a preferred embodiment of the present invention, the CNOs have carbon molecules in the shape of sphere sleeves, similar to carbon nanotubes with aspect ratios of about 1:1. The inner layers of CNOs are composed of 60 carbon atoms, and the number of carbon atoms of each layer increases exponentially with $60n^2$ (n is the number of layers), and the distance between each layer is about 0.335 nm.

The nano onion carbon can be prepared according to the requirements of the nano onion carbon in the invention by adopting a conventional mode in the field. For example, the preparation method of the bionic plugging agent with the nano onion carbon structure comprises the following steps: pouring a certain amount of naphthalene into the alcohol solution, stirring it to form a supersaturated solution, and then pouring the supersaturated solution into an alcohol lamp containing a wick. Cleaning the glass funnel, standing upside down, fixing on an iron stand, igniting an alcohol lamp containing saturated naphthalene, and smoking and baking the wide-mouth part of the glass funnel. The alcohol lamp was moved appropriately during the procedure to attach the sample sufficiently to the wide mouth of the glass funnel. The samples from wide mouth part was collected, and the sampled part was washed several times with absolute ethanol and deionized water, and dried in a vacuum oven at 60° C. for 12 hours.

According to the invention, the bionic plugging agent with the onion carbon micro-nano structure has excellent physical and chemical properties, and shows excellent small-size effect and quantum size effect. The bionic plugging agent with the onion carbon micro-nano structure has good temperature resistance and good thermal stability. The bionic plugging agent with the onion carbon micro-nano structure can be used for efficiently plugging special crack holes in the shale, so that the stability of the well wall is improved. The bionic plugging agent has a high matching ratio of the nano-scale spherical structure to the pore size, and can obviously improve the plugging effect. The bionic plugging agent with the onion carbon micro-nano structure can effectively plug special crack pores in the shale and almost has no influence on reservoir damage and environmental pollution. The nano-scale spherical structure of the onion carbon micro-nano structure bionic plugging agent is higher in matching with the pore size, so that the plugging effect can be obviously improved; and the bionic plugging agent has excellent performance and can meet the development requirement of modern drilling fluid.

According to the invention, the modified chitosan provided by the invention as a shale inhibitor can effectively inhibit hydration expansion and dispersion of shale, and has no negative effect on the performance of drilling fluid, and has no toxic or side effect, and can improve the well wall stability of shale oil-gas wells.

Preferably, the molecular weight of the chitosan is 20000-100000 g/mol, preferably 40000-90000 g/mol, more preferably 50000-85000 g/mol, for example 50000-75000 g/mol.

Preferably, the polyamine structure may be, for example, —NH—$(CH_2CH_2NH)n$-$CH_2CH_2$—$NH_2$, or a-NH-polyamine residue.

Preferably, the polyamine compound is one or more of polyene polyamine and polyethyleneimine, preferably one or more of diethylenetriamine, triethylene tetramine, tetraethylenepentamine and polyethyleneimine. Wherein, the polyethyleneimine can be, for example, polyethyleneimine with molecular weight of 300-5000 g/mol (preferably 600-3000 g/mol, more preferably 600-1500 g/mol).

Preferably, the modification group with the structure shown in the formula (1-d) is provided by reacting epichlorohydrin with a polyamine compound.

Preferably, the content of the modified group of the structure shown in formula (1) is 5 to 25% by weight, preferably 8 to 20% by weight, more preferably 8.5 to 17% by weight, relative to the total amount of the modified chitosan.

Preferably, the chitosan is connected with the modified group of the structure shown in the formula (1) through a group provided by benzaldehyde.

Preferably, the preparation method of the modified chitosan comprises the following steps:

carrying out acidification swelling treatment on chitosan;

in an alcohol solvent, carrying out the first contact reaction on the acidified and swelled chitosan and benzaldehyde;

in the first alkaline solution, performing the second contact reaction on the product obtained after the first contact reaction and epichlorohydrin;

in the second alkaline solution, performing the third contact reaction on the product obtained after the second contact reaction and the polyamine compound to enable the chitosan to be connected with a modified group with a structure shown in the formula (1-d).

According to the present invention, the swelling treatment may be a chitosan swelling treatment process which is conventional in the art. For example, chitosan may be contacted with an acidic solution to promote swelling of chitosan, which may be an aqueous glacial acetic acid solution, an aqueous hydrochloric acid solution, etc. For example, the concentration of acidic solution may be 1 to 5 wt %, and the amount of the acidic solution may vary within a wide range. For example, the amount of the acidic solution may be 10-30 mL, relative to 1 g of chitosan. The conditions of the swelling treatment may be, for example: the temperature is 20-40° C., and the time is 20-60 min.

After the swelling treatment, the first contact reaction can be directly carried out under the condition of introducing an alcohol solvent and benzaldehyde. Preferably, the conditions of the first contact reaction include: the temperature is 60-80° C., and the time is 5-8 h. Wherein, the reaction of benzaldehyde and chitosan is the condensation reaction of benzaldehyde and chitosan which is conventional in the field. After the first contact reaction, the reaction product may be washed and dried.

The alcohol solvent may be alcohol or alcohol-water mixture, preferably alcohol. Wherein the alcohol may be one or more of methanol, ethanol, n-propanol, etc., and the amount of the alcohol solvent may vary within a wide range. For example, the amount of the alcohol solvent is 10-100 mL, for example, 20-50 mL, relative to 1 g of chitosan.

According to the invention, the product obtained by the first contact reaction is subjected to a second contact reaction with epichlorohydrin in a first alkaline solution, so that a group with an epoxypropane structure can be substituted on chitosan, and the subsequent third contact reaction is carried out to react with amine groups. Wherein, preferably, the conditions of the second contact reaction include: the temperature is 45-60° C., and the time is 3-6 h.

According to the invention, the first alkaline solution may be aqueous solution of alkaline agent or ammonia, wherein the alkaline agent can be selected from one or more of sodium hydroxide, potassium hydroxide, lithium hydroxide, etc., and its concentration can be 0.2 to 0.6 mol/L, and its dosage can vary in a wide range, for example, the dosage of the first alkaline solution is 50 to 200 mL relative to 1 g of chitosan.

After the second contact reaction, the reaction product is washed and dried.

According to the invention, the product obtained by the second contact reaction and polyamine compound are subjected to a third contact reaction in the second alkaline solution, and then a modified group comprising polyamine groups can be formed on chitosan. Wherein, preferably, the conditions of the third contact reaction include: the temperature is 50-80° C. and the time is 3-6 h.

According to the invention, the second alkaline solution may be aqueous solution of alkaline agent or ammonia, wherein the alkaline agent can be selected from one or more of sodium hydroxide, potassium hydroxide, lithium hydroxide, etc., and its concentration can be 0.02-0.3 mol/L, and its dosage can vary in a wide range, for example, the dosage of the second alkaline solution is 50-200 mL, relative to 1 g of chitosan.

Preferably, the weight ratio of the chitosan to the benzaldehyde is 1:2-6, and preferably 1:2-4.

preferably, the weight ratio of the chitosan to the epichlorohydrin is 1:5-20, preferably 1:8-15.

preferably, the weight ratio of the usage amount of the epichlorohydrin to the polyamine compound is 1:0.05-0.5.

According to the invention, the dosage of each treating agent can vary in a wide range, and preferably, the content of the bionic wall-fixing agent is 0.5-3 wt % based on the total weight of the water-based drilling fluid without weighting agent; the content of the bionic lubricant is 0.5-3 wt %, and the content of the super dual-phobic agent is 1-5 wt %; the content of the scrap-carrying agent is 1-5 wt %; the content of the bionic shale inhibitor is 0.5-3 wt %. In the case of containing a bionic plugging agent, the content of the bionic plugging agent is preferably 1-3 wt %.

The water-based drilling fluid according to the present invention may further contain other additives conventionally used in the art, such as bentonite, fluid loss additive, viscosifier, anti-collapse agent, weighting agent, alkaline modifier, KCl, etc., and the kind and content of these additives may be those conventionally used in the art, which is not particularly limited in the present invention.

In a second aspect the invention provides the use of a drilling fluid as described above in oil and gas drilling.

The drilling fluid system provided by the invention has the following advantages: the system not only prevents and reduces the damage of drilling fluid to the well wall by controlling external factors influencing the rock strength (external cause anti-collapse), but also improves the rock cohesive strength and the rock cementing power (internal cause anti-collapse for curing the well wall). The system not only inhibits the occurrence of osmotic hydration, but also inhibits the occurrence of surface hydration. The whole body maintains the stability of the well wall through the way of combining internal and external reasons. The system utilizes a series of bionic treating agent new materials, protects unconventional oil and gas reservoirs by a physical-chemical synergistic method, and realizes the conversion from a physical method to a physical-chemical method. The system realizes "safe, efficient, economic and environment-friendly" drilling, and effectively improves the yield of oil and gas wells, and solves the technical problems of drilling fluids such as well wall collapse, blocking and sticking, well leakage, unclean borehole, damage to oil and gas reservoirs, environmental pollution and the like, and provides powerful technical support for the realization of the shale revolution of China. The system converts the original flowing lubrication into "flowing and bonding" lubrication, and the direct friction between a drilling tool and a well wall is converted into the sliding between films. The bionic theory and the underground rock surface double-sparse type theory are introduced into the field of drilling fluid for the first time.

The present invention will be described in detail below by way of examples.

Bionic Wall-Fixing Agent Preparation Example 1

Four monomers are added into 100 mL of distilled water according to the molar ratio of DMDAAC (dimethyldiallylammonium chloride):AM (acrylamide):AA (acrylic acid):Vac (vinyl acetate)=6:5:4.5:4.25 (so that the total molar concentration of the four monomers in the reaction system is 0.004 mol/mL), and nitrogen is introduced to remove oxygen. Then the initiator $(NH_4)_2S_2O_8$ accounts for 0.6 wt % of the total mass of the system (accounting for the total weight of the four monomers, the same applies below) is added, and the mixture is stirred at 69° C. for 300 r/min to react for 3 hours under the anaerobic condition. The polymer GB-1 for the well wall stabilizer is obtained, and the weight average molecular weight of the polymer GB-1 is 155000 g/mol.

Bionic Wall-Fixing Agent Preparation Example 2

Four monomers are added into 100 mL of distilled water according to the molar ratio of DMDAAC:methacrylamide:AA:Vac=6:5:4:3.8 (the total molar concentration in the reaction system is 0.004 mol/mL), and nitrogen is introduced to remove oxygen. Then the initiator potassium persulfate accounting for 0.5 wt % of the total mass of the system is added, and the mixture is stirred for 5 hours at 65° C. and under anaerobic condition for 300 r/min all the time. The polymer GB-2 for the well wall stabilizer is obtained, and the weight average molecular weight of the polymer GB-2 is 138000 g/mol.

Bionic Lubricant Preparation Example 1

Washing styrene by using 20 wt % NaOH aqueous solution at normal temperature, and the washed styrene according to the molar ratio of styrene:butyl acrylate=7:3 is added into 250 mL of deionized water (the total concentration is 0.2 mol/mL), and mixing to generate a shear emulsion reaction. Then introducing nitrogen for 30 min to replace air in a reaction container, raising the temperature to 50° C., adding the initiator potassium persulfate (the dosage is 0.01 mol % relative to the total molar dosage of styrene and butyl acrylate), and reacting for 90 min at 50° C.; then acrylamide is added according to the molar ratio of styrene:butyl acrylate:acrylamide=7:3:0.4. After the temperature is raised to 80° C., the initiator potassium persulfate (the dosage is 0.005 mol %, relative to the total molar dosage of styrene, butyl acrylate and acrylamide) is added to continue to react for 4 hours, and finally the temperature is reduced to room temperature, and the obtained reaction product is the high-temperature-resistant strong-adsorption bonding lubricant GF-1, and the weight average molecular weight of the lubricant is 20000 g/mol.

Bionic Lubricant Preparation Example 2

Washing styrene by using 20 wt % NaOH aqueous solution at normal temperature, and then mixing the washed styrene according to the molar ratio of styrene:methyl methacrylate=6:2 is added into 250 mL of deionized water (the total concentration is 0.3 mol/mL), and mixing the mixture to generate a shear emulsion reaction. Then introducing nitrogen into the reaction vessel for 30 min to replace air in the reaction vessel, raising the temperature to 40° C., adding the initiator potassium persulfate (the dosage is 0.02 mol %, relative to the total molar dosage of styrene and methyl methacrylate), and reacting the mixture for 80 min at 50° C.; then methacrylamide is added according to the molar ratio of styrene:methyl methacrylate:methacrylamide=6:2:0.3, and increasing the temperature to 70° C., adding the initiator potassium persulfate (the dosage is 0.01 mol %, relative to the total molar dosage of styrene, methyl methacrylate and methacrylamide), continuing to react for 3 hours, and finally cooling to room temperature to obtain the reaction product, namely lubricant GF-2 with the high-temperature-resistant strong-adsorption bonding, and the weight average molecular weight of the lubricant is 15000 g/mol.

Super Dual-Phobic Agent Preparation Example 1

(1) The single-walled carbon nanotube (purchased from Yamei Nano Technology Co., Ltd. Zhejiang, with the diameter of 10 nm and the length of 15000 nm) was added into the mixed solution of concentrated sulfuric acid and hydrogen peroxide (the weight ratio of the concentrated sulfuric acid to the hydrogen peroxide is 1:3, the concentration of the concentrated sulfuric acid is 98 wt %, and the concentration of the hydrogen peroxide is 30 wt %) to make the content of carbon nanotubes 0.5% by weight, and increasing the temperature to 90° C. for ultrasonic dispersion for 30 min.

(2) According to the molar ratio of the single-wall carbon nano tube (calculated by carbon element): KH570 (i.e. γ-methacryloxypropyltrimethoxysilane)=1:0.2, KH570 was added and the temperature was adjusted to 75° C. for 60 min.

(3) Then, according to the single-wall carbon nano tube (calculated by carbon element):perfluorooctylsulfonyl fluoride:methoxytriethoxysilane=1:1:2, perfluorooctylsulfonyl fluoride and methoxytriethoxysilane were added into the solution, and continuing to react for 4 h at 75° C., cooling to room temperature, and then washing with water to obtain a reaction product, namely the super dual-phobic agent SA-1.

Super Dual-Phobic Agent Preparation Example 2

The single-walled carbon nanotube (purchased from Yamei Nano Technology Co., Ltd. Zhejiang, with a diameter of 5 nm and a length of 10000 nm) was added into the mixed solution of concentrated sulfuric acid and hydrogen peroxide (the weight ratio of the concentrated sulfuric acid to the hydrogen peroxide is 1:2.5, the concentration of the concentrated sulfuric acid is 95 wt %, and the concentration of the hydrogen peroxide is 25 wt %) to make the content of carbon nanotubes 2% by weight, and increasing the temperature to 90° C. for ultrasonic dispersion for 40 min.

According to the molar ratio of the single-wall carbon nano tube (calculated by carbon element):acryloxypropyltriethoxysilane=1:0.25, acryloxypropyltriethoxysilane was added and the temperature was adjusted to 90° C. for 90 min.

Then, according to the single-wall carbon nano tube (calculated by carbon element):perfluorohexylsulfonyl fluoride:methoxytriethoxysilane=1:1.5:2, perfluorohexylsulfonyl fluoride and methoxytriethoxysilane were added into the solution, and continuing to react for 6 h at 90° C., cooling to room temperature, and then washing with water to obtain a reaction product, namely the super dual-phobic agent SA-2.

Scrap-Carrying Agent Preparation Example 1

In 100 mL of ethanol-water mixed solution (volume ratio of ethanol/water is 1:1), 10 g of nano kaolin (molar ratio of $Al_2O_3/SiO_2$ is 1:2, and particle size is 200 nm) is added, and ultrasonic dispersion is carried out for 30 min. Then according to the molar ratio of nano kaolin (calculated as $Al_2O_3$): KH570=1:1, KH570 is added and the temperature was raised to 55° C. for 30 min.

Then, according to nano kaolin (calculated as $Al_2O_3$): tridecafluorooctyl methacrylate:acrylamide=1:3:4, trifluorooctyl methacrylate and acrylamide are added into the solution, and adding 1 wt % of potassium persulfate serving as an initiator (based on the total mass of tridecafluorooctyl methacrylate and acrylamide), and continuing to react for 4 hours at 55° C., cooling to room temperature to obtain a reaction product, namely a scrap-carrying agent HEX-1, and identifying that the scrap-carrying agent HEX-1 is provided with a polyacrylamide polymer with the molecular weight of 45000 g/mol.

Scrap-Carrying Agent Preparation Example 2

In 100 mL of ethanol-water mixed solution (volume ratio of ethanol/water is 1:2), 5 g of nano kaolin (molar ratio of $Al_2O_3/SiO_2$ is 1:2, and particle size is 400 nm) is added, and ultrasonic dispersion is carried out for 30 min. Then according to the molar ratio of nano kaolin (calculated as $Al_2O_3$): acryloxypropyltriethoxysilane=1:1.5, acryloxypropyltriethoxysilane is added and the temperature was raised to 65° C. for 40 min of reaction.

Then, according to nano kaolin (calculated as $Al_2O_3$): tridecafluorooctyl methacrylate:methacrylamide=1:3:6, tridecafluorooctyl methacrylate and methacrylamide are added into the solution, and adding 0.8 wt % of potassium persulfate serving as an initiator (based on the total mass of tridecafluorooctyl methacrylate and methacrylamide), and continuing to react for 5 hours at 65° C., cooling to room temperature to obtain a reaction product, namely the scrap-carrying agent HEX-2, and identifying that the scrap-carrying agent HEX-2 is a polyacrylamide polymer with the molecular weight of 85000 g/mol.

Bionic Plugging Agent Preparation Example 1

Pouring a certain amount of naphthalene into 30 ml of alcohol solution, stirring to form supersaturated solution, and then pouring the supersaturated solution into an alcohol lamp containing a wick. Cleaning the glass funnel, standing upside down, fixing on an iron stand, igniting an alcohol lamp containing saturated naphthalene, and smoking and baking the wide-mouth part of the glass funnel. The alcohol lamp was moved appropriately during the procedure to attach the sample sufficiently to the wide mouth of the glass funnel. The samples from wide mouth part was collected, and the sampled part was washed several times with absolute ethanol and deionized water, and dried in a vacuum oven at 60° C. for 12 hours.

The surface topography of the sample was observed by scanning electron microscopy and transmission electron microscopy. The onion carbon nanospheres with a plurality of uniform sizes can be observed, certain adhesion or stacking exists among the spheres, and dense wrinkle layers exist in the spheres. The diameter of the carbon nano onion sphere is measured to be about 30-40 nm. The inner layer of the onion carbon nanosphere consists of 60 carbon atoms, the number of the carbon atoms of each layer is increased exponentially according to $60n^2$ (n is the number of the layers, the number of the layers is 50), and the distance between the layers is about 0.335 nm.

Bionic Shale Inhibitor Preparation Example 1

3 g of chitosan (with molecular weight of 50000 g/mol) was weighed and added to 40 ml of 2 wt % glacial acetic acid aqueous solution to swell for 30 min.

And then diluting with 40 mL of absolute ethanol, adjusting the pH=5, dropwise adding 11.7 g of benzaldehyde, heating in a water bath to 70° C., stirring and reacting for 6 hours, cooling to room temperature, washing with ethanol and diethyl ether, and drying at constant temperature to obtain a solid product A.

Then heating the solid product A and 250 ml of 0.4 mol/L NaOH aqueous solution in a water bath to 55° C., adding 30 ml of epoxy chloropropane, stirring and reacting for 5 hours, cooling to room temperature, washing with acetone and diethyl ether for 2 times respectively, and drying in vacuum at 60° C. to obtain a solid product B.

And finally, heating the solid product B and 180 ml of 0.1 mol/L NaOH aqueous solution in a water bath to 60° C., adding 13 g of polyethyleneimine (the molecular weight is 1000 g/mol), stirring for reaction for 4 hours, cooling to room temperature, precipitating the product with acetone, drying and crushing to obtain a powdery reaction product, namely the environment-friendly shale inhibitor EFYZ-1, wherein the content of a modified group provided by epoxy chloropropane and polyethyleneimine is 14.5 wt %.

Bionic Shale Inhibitor Preparation Example 2

3 g of chitosan (with molecular weight of 75000 g/mol) was weighed and added to 40 ml of 2% glacial acetic acid to swell for 30 min.

And diluting with 50 mL of absolute ethanol, adjusting the pH=5, dropwise adding 10 g of benzaldehyde, heating in a water bath to 65° C., stirring and reacting for 7 hours, cooling to room temperature, washing with ethanol and diethyl ether, and drying at constant temperature to obtain a solid product A.

Then heating the solid product A and 250 ml of 0.5 mol/L NaOH aqueous solution in a water bath to 60° C., adding 25 ml of epoxy chloropropane, stirring for reacting for 5 hours, cooling to room temperature, washing with acetone and diethyl ether for 2 times respectively, and drying in vacuum at 60° C. to obtain a solid product B.

And finally, heating the solid product B and 180 ml of 0.5 mol/L NaOH aqueous solution in a water bath to 70° C., adding 10 g of polyethyleneimine (with the molecular weight of 600 g/mol), stirring for reacting for 4 hours, cooling to room temperature, precipitating the product with acetone, drying and crushing to obtain a powdery reaction product, namely the environment-friendly shale inhibitor EFYZ-2, wherein the content of a modified group provided by epichlorohydrin and polyethyleneimine is 9.0 wt %.

Example 1

Bionic and dual-phobic drilling fluid: 0.15% of soil slurry (aqueous slurry containing 0.15% by weight of bentonite)+ 2% by weight of bionic wall-fixing agent GB-1+1.5% by weight of bionic lubricant GF-1+2.5% by weight of super dual-phobic agent SA-1+2% by weight of scrap-carrying agent HEX-1+1.5% by weight of bionic plugging agent onion carbon nanospheres+1.5% by weight of bionic shale inhibitor EFYZ-1+0.5% by weight of sulfomethyl phenolic resin fluid loss additive (SMP-II from XinXiang Xinlei oilfield additives Co., Ltd., the same applies below)+7% by weight of KCl, and in addition, barite adjusted to the required density (the weight percentages do not bring the barite into the calculation range).

Example 2

Bionic and dual-phobic drilling fluid: 0.15% of soil slurry (aqueous slurry containing 0.15 wt % bentonite)+1.5 wt % of bionic wall-fixating agent GB-2+1.5 wt % bionic lubricant GF-2+3 wt % super dual-phobic agent SA-2+1.5 wt % scrap-carrying agent HEX-2+1.5 wt % bionic plugging agent onion carbon nanosphere+1 wt % bionic shale inhibitor EFYZ-2+0.5 wt % sulfomethyl phenol formaldehyde resin fluid loss additive+6 wt % KCl, and additionally barite adjusted to the desired density (the above weight percentages do not bring barite into the calculated range).

Comparative Example 1

Typical oil-based drilling fluids: 80 wt % 3 #white oil+3 wt % co-emulsifier (VERSACOAT as co-emulsifier from M-I SWACO Company), 1 wt % primary emulsifier (VERSAMUL as primary emulsifier from M-I SWACO Company), 4 wt % wetting agent (VERSAWET from M-I SWACO Company), 20 wt % calcium chloride solution+1 wt % organic soil (VG-SUPREME from M-I SWACO Company), 0.5% shear strength agent (HRP from Halliburton Company), 4 wt % extra fine calcium+2% plugging fluid loss additive (HOF fluid loss additive from Hubei Hanke New Technology Co., Ltd.), additionally barite adjusted to the required density (the above weight percentages do not bring the weight spar into the calculated range).

Test example 1 for evaluation of drilling fluid rheological property, fluid loss wall building property and oil-gas layer protection effect The rheological properties of the bionic and dual-phobic drilling fluid and the oil-based drilling fluid are measured by a six-speed viscometer, and the test results are shown in the following table, and the test method is as follows:

"PV" refers to the plastic viscosity, measured by a van-type six-speed viscometer, and the unit is mpa·s;

$PV=\theta_{600}-\theta_{300}$

"AV" refers to apparent viscosity, measured by a van-type six-speed viscometer, and the unit is mpa·s;

$$AV = \frac{1}{2}\theta_{600}$$

"YP" means dynamic shear force calculated from data measured by a normal six-speed viscometer, and the unit is Pa;

$YP=0.511(\theta_{300}-PV)$ normal temperature medium pressure filtration loss (FLAPI) and high temperature high pressure filtration loss (FLHTHP) (temperature 150° C., pressure difference 3.5 MPa): according to standard SY/T56211993 drilling fluid test program in petroleum and gas industry, a ZNG 3 six-linkage medium-pressure water loss instrument and a 42-2A high-temperature high-pressure water loss instrument are used for measuring medium-pressure filtration loss FL (API) (the test temperature is 25° C., the test pressure is 0.69 MPa) and high-temperature high-pressure filtration loss FL (HTHP) (the test temperature is the same as the corresponding aging temperature of the drilling fluid to be tested, and the test pressure is 3.5 MPa).

The filter cake viscosity coefficient testing method comprises the following steps: the viscosity coefficient of the drilling fluid API filter cake is determined by using an NZ-3A type filter cake viscosity coefficient determinator of Qingdao Jiaonan analytical instruments factory. And lightly placing the instrument sliding block on the filter cake, turning the sliding plate after standing for one minute, reading the turning angle value of the sliding plate when the sliding block starts to slide, and finding out the tangent value corresponding to the turning angle, namely the viscosity coefficient of the filter cake.

The permeability recovery value test method comprises the following steps: testing the permeability recovery value of the rock core polluted by the drilling fluid by using a JHCF-1 type rock core dynamic damage pollution experimental instrument according to a reservoir pollution evaluation experimental method, wherein the method comprises the following steps:

the rock sample is completely saturated with formation water, and is statically aged for more than 24 h, and the experiment is carried out by using SY/T5358-2002 standard simulated formation water. 2. Under the conditions that the confining pressure is 4 MPa and the flow rate is 2.0 mL/min, the core is displaced by simulated formation water, the saline permeability of the core is measured after the pressure is stable, the neutral kerosene is used for displacement, and the oil phase permeability Ko of the core is measured after the pressure is stable; 3. and reversely polluting the rock core by using the drilling fluid, keeping the pressure during pollution equal to the displacement pressure, keeping the pollution time for 2 h, taking out the rock core from the holder after pollution, scraping a filter cake, and then changing the flow direction of the fluid. Under the condition that the flow rate is 2.0 mL/min, neutral kerosene is used for positive displacement, and after the pressure is stable, determine the oil phase permeability Ko' of the rock core polluted by drilling fluid; 4. and calculating the recovery value Ko'/Ko of the permeability of the rock core after the pollution of the drilling fluid.

As can be seen from the table 1, compared with the oil-based drilling fluid, the bionic and dual-phobic drilling fluid has higher dynamic-plastic ratio, better rheological property and equivalent fluid loss wall building property, and the lubricity and the oil-gas layer protection effect of the water-based drilling fluid are higher than those of the oil-based drilling fluid for the first time. This is because the super dual-phobic agent forms a micro-nano mastoid structure on the surface of filter cake, reduces the surface energy, and then has strong self-cleaning property, so that the direct friction between metal and the filter cake is changed into the sliding between films, and the friction force is greatly reduced, and the friction resistance in the drilling fluid is greatly reduced by combining the bionic bonding lubricant. Simultaneously, make the capillary self-suction is reversed into the resistance to prevent the liquid phase from entering the rock core, reaching the effect of protection oil and gas layer.

Test Example 2 for Drilling Fluid Inhibition Performance

Core recovery rate: rock debris from 3 wells (12-1-B5, 12-1-B6 and 12-1-6) in an extremely easy well collapse well section of an offshore oil field in south China sea and rock debris of shale gas wells in Weiyuan and Changning are selected, placed in aging tanks of typical oil-based drilling fluid and bionic and dual-phobic drilling fluid respectively, rolled for 16 hours at the temperature of 150° C. The primary recovery rate of the rock debris is measured; and taking the recovered rock debris, repeating the steps again, and measuring the secondary recovery rate of the rock cuttings.

Linear expansion ratio: weighing 5 g of sodium bentonite in a core sleeve, pressing and holding the core sleeve for 5 min under 10 MPa, adding the drilling fluid to be tested and clear water into the test sleeve respectively, and performing an expansibility test by adopting a normal temperature and pressure CPZ-II dual-channel shale expansion instrument (Qingdao Jiaonan analytical instrument factory).

TABLE 2

| Well number | Core recovery, % | typical oil-based drilling fluid | bionic and dual-phobic drilling fluid example 1 |
|---|---|---|---|
| 12-1-B5 | Primary recovery rate | 93.5 | 95.6 |
|  | Secondary recovery rate | 50 | 79 |

TABLE 1

| Type | density g/cm³ | AV mPa·s | PV mPa·s | YP Pa | GEL Pa/Pa | filtration loss, ml | | filter cake viscosity coefficient | permeability recovery value, % |
|---|---|---|---|---|---|---|---|---|---|
| | | | | | | API | HTHP | | |
| Bionic and dual-phobic drilling fluid example 1 | 1.39 | 26 | 17 | 9.20 | 2/4 | 0.5 | 4.6 | 0.021 | 96.5 |
| Bionic and dual-phobic drilling fluid example 2 | 1.43 | 33.5 | 21 | 12.78 | 3/6 | 0.5 | 4.2 | 0.024 | 95.1 |
| Typical oil-based drilling fluids | 1.39 | 30 | 23 | 7.15 | 2.5/7 | 0.5 | 4.5 | 0.025 | 94.4 |

Note:
aging at 150° C. for 16 h; the high-temperature high-pressure filtration loss measurement temperature is 150° C., and the pressure difference is 3.5 MPa.

TABLE 2-continued

| Well number | Core recovery, % | typical oil-based drilling fluid | bionic and dual-phobic drilling fluid example 1 |
|---|---|---|---|
| 12-1-B6 | Primary recovery rate | 98 | 98.2 |
|  | Secondary recovery rate | 95.3 | 95.6 |
| 12-1-6 | Primary recovery rate | 94.8 | 98.7 |
|  | Secondary recovery rate | 93.9 | 96.7 |
| Weiye shale gas well | Primary recovery rate | 82.3 | 96.3 |
| Changning shale gas well | Primary recovery rate | 97.9 | 98.7 |
| Linear expansion ratio/% | | | |
| clean water |  | 121.8% | |
| Typical oil-based drilling fluids |  | 1.9% | |
| Bionic and dual-phobic drilling fluid example 1 |  | 2.5% | |

Note:
rolling at 150° C. for 16 h.

The table shows that the bionic and dual-phobic drilling fluid disclosed by the invention has good inhibition performance, can obviously improve the rolling recovery rate of shale in water, and reduces the linear expansion rate of sodium bentonite.

Test Example 3 for Compressive Strength of Core

Rock debris in a well section which is extremely prone to well collapse in offshore oil fields in south China sea is ground and pressed into rock cores with similar performance, and respectively placed into aging tanks of typical oil-based drilling fluid and bionic and dual-phobic drilling fluid, and the aging tanks are aged for 3 d and 10 d at 120° C., and the rock cores are taken out to measure the compressive strength, as shown in table 3.

TABLE 3

| | Drilling fluid system | |
|---|---|---|
| | typical oil-based drilling fluid | bionic and dual-phobic drilling fluid example 1 |
| Core Strength after 3 days, MPa | 4.74 | 4.94 |
| Core Strength after 10 days, MPa | 2.19 | 2.59 |

Note:
the original strength of the core is 8.89 MPa, and the core is 1.82 MPa after being soaked in clear water for 3 min; continuously soaking at 120° C. under 3.5 MPa for 3 d and 10 d.

Table 3 shows that after 3 days, the bionic and dual-phobic drilling fluid improves the compressive strength of the core by 4.22% compared with the typical oil-based drilling fluid; after 10 days, the improvement is 18.26%. The bionic and dual-phobic drilling fluid achieves the purpose of improving the strength of the rock core, and the improvement range is larger along with the increase of time. Therefore, the bonding force and cohesion among rock particles are improved through the chelation effect of the bionic wall-fixing agent, and the surface hydration and osmotic hydration are prevented through forming the micro biological net gel on the surface of the rock core, and the problem of capillary effect is solved by combining the wetting inversion of the super dual-phobic agent on the surface of the rock core. For the first time, the well wall stability of water-based drilling fluid is higher than that of oil-based drilling fluid, and the long-standing technical problems at home and abroad have been solved.

Test Example 4 for Environmental Protection Performance

The results of the heavy metal ion content, biotoxicity and biodegradability tests show that (tables 4 and 5), the drilling fluid system of the present invention (tested with the drilling fluid sample of example 1) is safe, non-toxic and biodegradable. The test methods of the content of the heavy metal ions comprises the following steps: heavy metal detection is tested according to "HJ-776-2015 Water quality—Determination of 32 elements—Inductively coupled plasma emission spectrometry" and "HJ 694-2014 Water quality—Determination of mercury, arsenic, selenium, bismuth and antimony—atomic fluorescence spectrometry".

The biotoxicity and biodegradability test methods include: according to "Q/SY 111-2007 Grading and determination of biotoxicity of chemicals and drilling fluids—the luminescent bacteria test", the EC50 value was tested by luminescent bacteria method and the biotoxicity was evaluated. The biodegradability detection is carried out by adopting a BOD/COD ratio method, and specifically, the COD and BOD tests are respectively carried out by adopting the standards, and the standards are "HJ 132-2003 High-chlorine wastewater—Determination of chemical oxygen demand—Potassium iodide alkaline Permanganate method" and "HJ 505-2009 Water quality—Determination of biochemical oxygen demand after 5 days ($BOD_5$) for dilution and seeding method".

TABLE 4 determination of the content of heavy metal ions

| | Heavy metal species | | | | |
|---|---|---|---|---|---|
| | cadmium (Cd) | mercury (Hg) | lead (Pb) | total chromium (TCr) | arsenic (As) |
| Content, mg/kg | 8.5 | 7.65 | 356 | 189 | 45 |

TABLE 5 evaluation of environmental protection Properties

| Sample | $EC_{50}$ (mg/L) | $COD_{Cr}$ (mg/L) | $BOD_5$ (mg/L) | $BOD_5/COD_{Cr}$ | biodegradability |
|---|---|---|---|---|---|
| Drilling fluid | $3.06 \times 10^4$ | $2.04 \times 10^5$ | $2.53 \times 10^4$ | 0.124 | degradable |

The evaluation proves that the bionic and dual-phobic drilling fluid has good rheological property and filtration wall building property. The inhibitive property, the lubricating property and the oil-gas layer protection effect of the bionic and dual-phobic drilling fluid are superior to those of the typical oil-based drilling fluid, and the bionic and dual-phobic drilling fluid is non-toxic and environmentally acceptable, can effectively solve the technical problems of well collapse, high friction resistance, serious oil-gas layer damage and the like commonly encountered in unconventional and complex oil-gas drilling such as compact shale and the like, and meets the drilling requirements of safety, high efficiency, economy and environmental protection.

Test Example 5 for Bionic and Dual-Phobic Drilling Fluid High-Quality Shale Oil Horizontal Well Completion Drilling Application The Jimsar JHWO23 horizontal well is located in a Jimsar sag Ji37 well Lucaogou group block, and the easily-appearing complex stratum in the drilling process mainly comprises an Badaowan group, Jiucaiyuan group and Wutonggou group with the well depth of 2400-2800 m. Well leakage is easy to occur at the upper part of the well section, and the junction between the Jiucaiyuan and Wutonggou is easy to collapse, causing complex conditions under the well such as drilling and blockage. The third spudding of the Jimsar JHW023 horizontal well is completed, and the third spudding adopts a bionic and dual-phobic drilling fluid technology. The technical problems of the drilling fluid in the third spudding stage mainly include: the reservoir stratum of Lucaogou group is fractured and developed, and well collapse and well leakage are easy to occur; and the horizontal section is difficult to carry rocks, and it is easy to generate a detritus bed, causing blockage and the circulation resistance, and the stratum is easy to leak, and the borehole wall is easy to collapse; and the horizontal section drilling tool has large contact surface with the well wall, and it is easy to cause sticking and the like.

The rock debris returned from the JHW023 well drilled by adopting a bionic and dual-phobic drilling fluid system (the drilling fluid system of the embodiment 1) is regular, and the amount of the returned rock debris is large and is consistent with the drilling process, which indicates that the drilling fluid has good inhibition performance and sand carrying performance. The total cost of the well is lowest, and the well drilling fluid cost is saved by about 230 ten thousand yuan compared with the adjacent well of the same well type. The well diameter of the horizontal well section of the third spudding reservoir is regularly, and the average well diameter enlargement rate of the reservoir section is −1.35%, and the average well diameter enlargement rate of the same-well type well-facing reservoir section is 2.04%. This fully embodies the excellent collapse resistance, inhibition capability, plugging capability, lubricating property, fluid loss wall building property and the like of the bionic and dual-phobic drilling fluid; and the friction resistance is less than 100 KN, and the circulating pressure loss and the torque are low, and the stability and the lubricity of the well wall are equivalent to those of the oil-based drilling fluid, and the like.

TABLE 6

JHW023 well to adjacent well cost comparison

| well number | Total cost/ ten thousand yuan | average hole diameter enlargement rate of oil layer/% | remark |
|---|---|---|---|
| JHW023 | 180 | −1.35 | bionic and dual-phobic drilling fluid |
| JHW007 | 235 | 3.56 | potassium-calcium based oil-mixing drilling fluid |
| JHW015 | 371 | −1.51 | potassium-calcium based oil mixing drilling fluid |
| JHW016 | 329 | 2.38 | potassium-calcium based oil-mixing drilling fluid |
| JHW017 | 738 | 0.69 | potassium-calcium based oil-mixing drilling fluid |

In summary, the on-site application in unconventional oil and gas wells proves that under the guidance of the theory of dual-phobicity on the surface of underground rocks and the theory of blocking rock pores on the wall of a well, the created bionic and dual-phobic drilling fluid technology not only solves the technical problems of well wall collapse, oil and gas layer damage, large friction and abrasion, slow drilling speed, unclean well bore and the like in the drilling process, but also has important significance in facilitating the research and design of the drilling fluid by a large number of scientific and technical personnel, changing the improvement of the performance of the drilling fluid into the realization of the synergy of performance, effect and cost from high performance to high efficiency, and realizing the safe, high-efficiency, economic and environment-friendly drilling. Meanwhile, combined with the bionic drilling fluid technology, the cross-over progress that the inhibitive performance, the lubricating performance and the oil-gas layer protecting effect of the water-based drilling fluid exceed the level of the oil-based drilling fluid is realized internationally for the first time.

The preferred embodiments of the present invention have been described above in detail, but the present invention is not limited thereto. Within the scope of the technical idea of the invention, many simple modifications can be made to the technical solution of the invention, including various technical features being combined in any other suitable way, and these simple modifications and combinations should also be regarded as the disclosure of the invention, and all fall within the scope of the invention.

The invention claimed is:

1. A bionic and dual-phobic drilling fluid, wherein the drilling fluid comprising a bionic wall-fixing agent, a bionic lubricant, a super dual-phobic agent, a scrap-carrying agent and a bionic shale inhibitor;

the bionic wall-fixing agent is an acrylamide polymer containing a structural unit shown in a formula (1-a), a structural unit shown in a formula (2-a), a structural unit shown in a formula (3-a) and a structural unit shown in a formula (4-a), wherein the molar ratio of the structural unit shown in the formula (1-a), the structural unit shown in the formula (2-a), the structural unit shown in the formula (3-a) and the structural unit shown in the formula (4-a) is 1:(1.05-3):(0.5-0.95):(0.2-0.9);

formula (1-a)

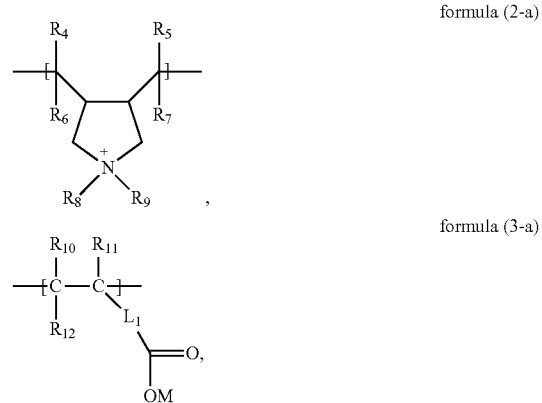

formula (2-a)

formula (3-a)

-continued

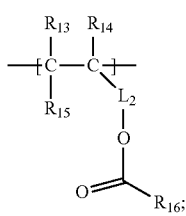
formula (4-a)

wherein $R_1$-$R_7$, $R_{10}$-$R_{12}$ and $R_{13}$-$R_{15}$ are each independently selected from H and C1-C6 alkyl; $R_8$-$R_9$ and $R_{16}$ are selected from alkyl groups of C1-C8; M is selected from H or alkali metal elements; $L_1$ and $L_2$ are each independently selected from the group consisting of C0-C6 alkylene;

the bionic lubricant is a block polymer, and the block polymer comprises a block A containing a carboxylic ester structural unit and a benzene-containing structural unit, and a block B containing an acrylamide structural unit connected with the block A; the benzene-containing structural unit is a structural unit shown in a formula (1-b); the carboxylic ester structural unit is one or more of structural units shown in formulas (2-b) and (3-b); the acrylamide structural unit is a structural unit shown in a formula (4-b);

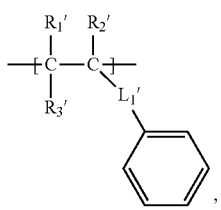
formula (1-b)

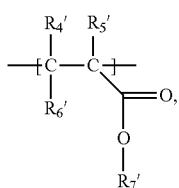
formula (2-b)

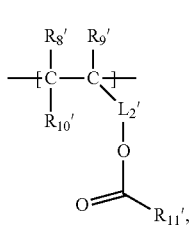
formula (3-b)

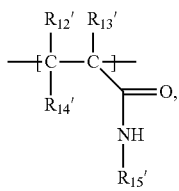
formula (4-b)

wherein $R_1'$-$R_2'$, $R_4'$-$R_6'$, $R_8'$-$R_{10}'$ and $R_{12}'$-$R_{14}'$ are each independently selected from H and C1-C6 alkyl; $L_1'$ is selected from C0-C6 alkylene; $R_7'$ and $R_{11}'$ are selected from C1-C8 alkyl; $R_{15}'$ is selected from H, C1-C8 alkyl, -$L_2'$-SOOM', $L_2'$ is selected from alkylene of C1-C6, and M' is H or alkali metal element; $R_3'$ is selected from H, C1-C6 alkyl, phenyl or phenyl-substituted alkyl of C1-C6;

the super dual-phobic agent is a modified carbon nanotube with a modifying group on the surface, wherein the modifying group comprises a modifying group provided by a silane coupling agent containing unsaturated carbon-carbon double bonds, perfluorosulfonyl halide represented by a formula $R^1SO_2X$ and siloxane represented by a formula $R^3Si(OR^2)_3$; wherein $R^1$ is perfluoro-substituted alkyl of C4-C12, X represents halogen; $R^3$ is selected from alkyl of C1-C6 and alkoxy of C1-C6, $R^2$ is selected from alkyl of C1-C6;

the scrap-carrying agent is an $Al_2O_3/SiO_2$ composite material, and the composite material comprises solid particles containing $Al_2O_3$ and $SiO_2$, and a polyacrylamide polymer modified on the surfaces of the solid particles; wherein the polyacrylamide polymer contains structural units shown in a formula (1-c) and a formula (2-c):

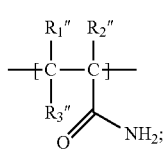
formula (1-c)

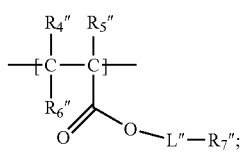
formula (2-c)

wherein, $R_1''$-$R_6''$ are each independently selected from H or C1-C6 alkyl; L'' is selected from C0-C6 alkylene; $R_7''$ is selected from C6-C20 alkyl substituted by halogen;

the bionic shale inhibitor is modified chitosan, and the modified chitosan is connected with a modifying group with a structure shown in a formula (1-d); formula (1-d): —$CH_2$—$CH(OH)CH_2$-polyamine structure; and the polyamine structure is provided by polyamine compounds.

2. The drilling fluid according to claim 1, wherein in the bionic wall-fixing agent, the molar ratio of the structural unit shown in the formula (1-a), the structural unit shown in the formula (2-a), the structural unit shown in the formula (3-a), the structural unit shown in the formula (4-a) is 1:(1.1-2):(0.6-0.95):(0.5-0.9), the weight average molecular weight of the polymer as the bionic wall-fixing agent is 80000-250000 g/mol, preferably 95000-220000 g/mol;

$R_1$-$R_7$, $R_{10}$-$R_{12}$ and $R_{13}$-$R_{15}$ are each independently selected from H and C1-C4 alkyl; $R_8$-$R^9$ and $R_{16}$ are selected from alkyl groups of C1-C6; M is selected from H, Na or K; $L_1$ and $L_2$ are each independently selected from the group consisting of C0-C4 alkylene.

3. The drilling fluid according to claim 1, wherein $R_1$-$R_7$, $R_{10}$-$R_{12}$ and $R_{13}$-$R_{15}$ are each independently selected from H, methyl, ethyl or n-propyl; $R_8$-$R_9$ and $R_{16}$ are selected from methyl, ethyl, n-propyl, isopropyl, n-butyl or isobutyl; M is selected from H, Na or K; $L_1$ and $L_2$ are each independently absent, —CH$_2$—, —CH$_2$CH$_2$—, —CH$_2$CH$_2$CH$_2$— or —CH$_2$CH$_2$CH$_2$CH$_2$—.

4. The drilling fluid according to claim 1, wherein the structural unit represented by formula (1-a) is provided by acrylamide and/or methacrylamide; the structural unit represented by the formula (2-a) is provided by one or more of dimethyldiallylammonium chloride, dimethyldiallylammonium fluoride, diethyldiallylammonium chloride, diethyldiallylammonium fluoride, dimethyldi (2-alkenylbutyl) ammonium chloride, dimethyldi (2-alkenylbutyl) ammonium fluoride, diethyldi (2-alkenylbutyl) ammonium chloride and diethyldi (2-alkenylbutyl) ammonium fluoride; the structural unit shown in the formula (3-a) is provided by one or more of acrylic acid, methacrylic acid, 2-butenoic acid, sodium acrylate, sodium methacrylate and sodium 2-butenoate; the structural unit represented by the formula (4-a) is provided by one or more of vinyl acetate, vinyl n-propionate, isopropenyl acetate, isopropenyl n-propionate, propenyl acetate and propenyl n-propionate.

5. The drilling fluid according to claim 1, wherein in the bionic lubricant, the molar ratio of the benzene-containing structural units, the carboxylic ester structural units and acrylamide structural units is (2-10): 1:(0.01-0.8);

the block A is a random copolymer block consisting of a benzene-containing structural unit and a carboxylic ester structural unit, or is a two-block polymer block consisting of a block A1 consisting of a benzene-containing structural unit and a block A2 consisting of a carboxylic ester structural unit;

the weight average molecular weight of the block polymer as the bionic lubricant is 10000-50000 g/mol, preferably 12000-40000 g/mol;

$R_1'$-$R_2'$, $R_4'$-$R_6'$, $R_8'$-$R_{10}'$ and are each independently selected from H and C1-C4 alkyl; $L_1'$ is selected from C0-C4 alkylene; $R_7'$ and $R_{11}'$ are each independently selected from the group consisting of C1-C6 alkyl; $R_{15}'$ is selected from H, C1-C6 alkyl or -$L_2'$-SOOM', $L_2'$ is selected from alkylene of C1-C6, and M' is H, Na or K; $R_3'$ is selected from H, C1-C4 alkyl, phenyl or phenyl-substituted alkyl of C1-C4.

6. The drilling fluid according to claim 1, wherein $R_1'$-$R_2'$, $R_4'$-$R_6'$, $R_8'$-$R_{10}'$ and $R_{12}'$-$R_{14}'$ are each independently selected from H, methyl, ethyl or n-propyl; $L_1'$ is absent, —CH$_2$—, —CH$_2$CH$_2$—, —CH$_2$CH$_2$CH$_2$— or —CH$_2$CH$_2$CH$_2$CH$_2$—; $R_7'$ and $R_{11}'$ are each independently selected from methyl, ethyl, n-propyl, isopropyl, n-butyl or isobutyl; $R_{15}'$ is selected from H, methyl, ethyl, n-propyl, isopropyl, n-butyl, isobutyl, —CH$_2$-SOOM', —CH$_2$CH$_2$-SOOM', —CH$_2$CH$_2$CH$_2$-SOOM', —CH(CH$_3$)CH$_2$-SOOM', —CH$_2$CH(CH$_3$)—SOOM', —C(CH$_3$)$_2$—SOOM', —CH$_2$CH$_2$CH$_2$CH$_2$-SOOM', —CH(CH$_3$)CH$_2$CH$_2$-SOOM', —CH$_2$CH(CH$_3$)CH$_2$-SOOM', —CH$_2$CH$_2$CH(CH$_3$)—SOOM', —C(CH$_3$)$_2$CH$_2$-SOOM' or —CH$_2$C(CH$_3$)$_2$—SOOM', M' is H, Na or K; $R_3'$ is selected from H, methyl, ethyl, n-propyl, phenyl or benzyl.

7. The drilling fluid according to claim 1, wherein the benzene-containing structural unit is provided by a compound selected from styrene and derivatives thereof, and stilbene and derivatives thereof the carboxylic ester structural unit is provided by a compound selected from butyl acrylate and derivatives thereof, methyl methacrylate and derivatives thereof, and vinyl acetate and derivatives thereof; the acrylamide structural unit is provided by a compound selected from acrylamide and derivatives thereof, 2-acrylamidopropanesulfonic acid and derivatives thereof, and 2-acrylamido-2-methylpropanesulfonic acid and derivatives thereof.

8. The drilling fluid according to claim 1, wherein in the super dual-phobic agent, $R^1$ is a perfluoro-substituted alkyl group of C6-C10, X represents fluorine or chlorine; $R^3$ is selected from C2-C6 alkyl and C2-C6 alkoxy, $R^2$ is selected from C1-C4 alkyl.

9. The drilling fluid according to claim 1, wherein the silane coupling agent containing unsaturated carbon-carbon double bond is one or more of acryloxy C1-C8 alkyltrialkoxysilane, methacryloxy C1-C8 alkyltrialkoxysilane, acrylamido C1-C8 alkyltrialkoxysilane, methacrylamido C1-C8 alkyltrialkoxysilane, vinyltrialkoxysilane and propenyl trialkoxysilane; the perfluorosulfonyl halide represented by the formula $R^1SO_2X$ is one or more of perfluorohexylsulfonyl fluoride, perfluorohexylsulfonyl chloride, perfluorooctylsulfonyl fluoride, perfluorooctylsulfonyl chloride, perfluorodecylsulfonyl fluoride and perfluorodecylsulfonyl chloride; the siloxane represented by the formula $R^3Si(O R^2)_3$ is one or more of methoxy triethoxysilane, methoxy tripropoxysilane, ethoxytripropoxysilane and ethoxytrimethoxy silane.

10. The drilling fluid according to claim 1, wherein the silane coupling agent containing unsaturated carbon-carbon double bonds is γ-methacryloxypropyltrimethoxysilane;

the perfluorosulfonyl halide represented by the formula $R^1SO_2X$ is perfluorooctylsulfonyl fluoride, and the siloxane represented by the formula $R^3Si(O R^2)_3$ is methoxytriethoxysilane;

the carbon nanotubes are single-walled carbon nanotubes or multi-walled carbon nanotubes;

the tube diameter of the single-walled carbon nanotube is 2-50 nm, and the length is 1000-20000 nm; the inner diameter of the multi-wall carbon nano tube is 2-30 nm, the outer diameter is 5-50 nm, and the length is 1000-30000 nm;

in the modified carbon nanotube, the molar ratio of the modified carbon nanotube, the modifying group provided by the silane coupling agent containing unsaturated carbon-carbon double bond, the modifying group provided by the perfluorosulfonyl halide represented by the formula $R'SO_2X$, and the modifying group provided by the siloxane represented by the formula $R^3Si(O R^2)_3$ is 1:0.05-0.5:0.2-5:0.5-6.

11. The drilling fluid according to claim 1, wherein in the scrap-carrying agent, $R_1''$-$R_6''$ are each independently selected from H or C1-C4 alkyl; L" is selected from C0-C4 alkylene; $R_7''$ is selected from C4-C16 alkyl substituted by halogen;

in the polyacrylamide polymer, the molar ratio of the structural units shown in the formula (1-c) to the structural units shown in the formula (2-c) is 1:0.2-5; or in the composite material, the molar ratio of the solid particles calculated by $Al_2O_3$ to the structural units shown in the formulae (1-c) and (2-c) in the polyacrylamide polymer is 1:(0.5-10):(1-15);

the molecular weight of the polyacrylamide polymer is 20000-120000 g/mol;

the molar ratio of $Al_2O_3$ to $SiO_2$ in the solid particles is 1:1-5, or the solid particles are silicate containing $Al_2O_3$;

the solid particles and the polyacrylamide polymer are combined through a silane coupling agent, the silane coupling agent is a silane coupling agent containing unsaturated carbon-carbon double bonds, the silane coupling agent containing unsaturated carbon-carbon double bonds is one or more of acryloxy C1-C8 alkyl trialkoxysilane, methacryloxy C1-C8 alkyl trialkoxysilane, acrylamido C1-C8 alkyl trialkoxysilane, methacrylamido C1-C8 alkyl trialkoxysilane, vinyl trialkoxysilane and propenyl trialkoxysilane.

12. The drilling fluid according to claim 1, wherein $R_1''$-$R_6''$ are each independently selected from H, methyl, ethyl or n-propyl; L" is absent, —$CH_2$—, —$CH_2CH_2$—, —$CH_2CH_2CH_2$— or —$CH_2CH_2CH_2CH_2$—; $R_7''$ is selected from C6-C12 alkyl substituted by fluorine, chlorine or bromine.

13. The drilling fluid according to claim 1, wherein $R_7''$ is selected from perfluoro substituted C6 alkyl, undecafluoro substituted C6 alkyl, nonafluoro substituted C6 alkyl, perfluoro substituted C8 alkyl, pentadecafluoro substituted C8 alkyl, tridecfluoro substituted C8 alkyl, undecafluoro substituted C8 alkyl, nonafluoro substituted C8 alkyl, perfluoro substituted C10 alkyl, nonadecafluoro substituted C10 alkyl, heptadecafluoro substituted C10 alkyl, pentadecafluoro substituted C10 alkyl, tridecafluoro substituted C10 alkyl, undecafluoro substituted C10 alkyl, nonafluoro substituted C10 alkyl, perfluoro substituted C12 alkyl, tricosafluoro substituted C12 alkyl, heneicosafluoro substituted C12 alkyl, nonadecafluoro substituted C12 alkyl, heptadecafluoro substituted C12 alkyl, pentadecafluoro substituted C12 alkyl, tridecafluoro substituted C12 alkyl, undecafluoro substituted C12 alkyl or nonafluoro substituted C12 alkyl.

14. The drilling fluid according to claim 1, wherein the drilling fluid further comprises a bionic plugging agent, wherein the bionic plugging agent is nano onion carbon.

15. The drilling fluid according to claim 14, wherein in the bionic plugging agent, the diameter of the nano onion carbon is 10-100 nm;
the innermost layer of the nano onion carbon consists of 50 to 80 carbon atoms;
the distance between the layers of the nano onion carbon is 0.1-0.5 nm;
the nano onion carbon has 10 to 100 carbon layers.

16. The drilling fluid according to claim 1, wherein in the bionic shale inhibitor, the polyamine compound is one or more of polyene polyamine and polyethyleneimine;
the modification group with the structure shown in the formula (1-d) is provided by reacting epichlorohydrin with a polyamine compound.

17. The drilling fluid according to claim 1, wherein the content of the modified group is 5 to 25 wt %, relative to the total amount of the modified chitosan;
the chitosan is connected with the modified group of the structure shown in the formula (1) through a group provided by benzaldehyde.

18. The drilling fluid according to claim 1, wherein the content of the bionic wall-fixating agent is 0.5-3 wt %; the content of the bionic lubricant is 0.5-3 wt %; the content of the super dual-phobic agent is 1-5 wt %; the content of the scrap-carrying agent is 1-5 wt %; the content of the bionic shale inhibitor is 0.5-3 wt %.

19. The drilling fluid according to claim 15, wherein the content of the bionic plugging agent is 1-3 wt %.

* * * * *